US011350356B2

(12) United States Patent
Yang et al.

(10) Patent No.: US 11,350,356 B2
(45) Date of Patent: May 31, 2022

(54) SESSION ESTABLISHMENT METHOD, RELAY DEVICE SELECTION METHOD, REGISTRATION METHOD, AND DEVICE

(71) Applicant: HUAWEI TECHNOLOGIES CO., LTD., Guangdong (CN)

(72) Inventors: Haorui Yang, Shenzhen (CN); Hui Jin, Beijing (CN); Fenghui Dou, Beijing (CN); Xiaoyan Duan, Shenzhen (CN); Xiaojuan Li, Beijing (CN); Guowei Ouyang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 41 days.

(21) Appl. No.: 17/050,281

(22) PCT Filed: Apr. 25, 2018

(86) PCT No.: PCT/CN2018/084477
§ 371 (c)(1),
(2) Date: Oct. 23, 2020

(87) PCT Pub. No.: WO2019/205027
PCT Pub. Date: Oct. 31, 2019

(65) Prior Publication Data
US 2021/0084581 A1 Mar. 18, 2021

(51) Int. Cl.
*H04W 48/18* (2009.01)
*H04W 76/10* (2018.01)
(Continued)

(52) U.S. Cl.
CPC ............ *H04W 48/18* (2013.01); *H04W 8/08* (2013.01); *H04W 48/16* (2013.01); *H04W 60/00* (2013.01); *H04W 76/10* (2018.02)

(58) Field of Classification Search
CPC ..... H04W 48/18; H04W 60/00; H04W 48/16; H04W 76/11; H04W 76/10; H04W 4/70;
(Continued)

(56) References Cited

U.S. PATENT DOCUMENTS

2017/0303259 A1  10/2017  Lee et al.
2018/0054237 A1   2/2018  Tseng et al.
(Continued)

FOREIGN PATENT DOCUMENTS

CN    106851589 A    6/2017
CN    107223350 A    9/2017

OTHER PUBLICATIONS

ZTE Corporation, NW slicing for high layer functional split, R3-180139, 3GPP TSG-RAN WG3 NR AdHoc, Sophia Antipolis, France, Jan. 22-26, 2018, 8 pages.
(Continued)

*Primary Examiner* — Daniel Lai
(74) *Attorney, Agent, or Firm* — Womble Bond Dickinson (US) LLP

(57) ABSTRACT

Embodiments of this application relate to the field of communications technologies, and disclose a relay device selection method, and a user equipment, so that UE can select and update with an allowed S-NSSAI of the UE. The method may include: obtaining by UE, M pieces of first indication information, each indicates one allowed network slice of the UE; receiving by the UE, first messages sent by L relay devices, comprising N pieces of second indication information, wherein each indicates one allowed network slice of the relay device; and selecting by the UE, a random first relay device as a target relay device based on the M pieces of first indication information and the L pieces of first messages.

14 Claims, 11 Drawing Sheets

(51) Int. Cl.
*H04W 8/08* (2009.01)
*H04W 48/16* (2009.01)
*H04W 60/00* (2009.01)

(58) Field of Classification Search
CPC ..... H04W 24/02; H04W 76/15; H04W 48/14; H04W 36/08; H04W 76/14; H04W 76/25; H04W 80/02; H04W 88/04; H04W 28/06; H04W 76/19; H04W 40/246; H04W 8/005; H04W 4/40; H04W 8/14; H04W 4/46; H04W 36/36; H04W 76/50; H04W 8/08; H04W 48/12; H04W 76/12; H04W 72/04; H04L 5/0092; H04L 5/0096
See application file for complete search history.

(56) References Cited

U.S. PATENT DOCUMENTS

| | | | |
|---|---|---|---|
| 2018/0109308 A1 | 4/2018 | Leroux | |
| 2018/0192445 A1* | 7/2018 | Jiang | H04W 72/0466 |
| 2019/0274177 A1* | 9/2019 | Kuge | H04W 48/12 |
| 2019/0349951 A1* | 11/2019 | Ahmad | H04W 76/14 |
| 2020/0015158 A1* | 1/2020 | So | H04W 48/18 |
| 2020/0059987 A1* | 2/2020 | Hong | H04L 41/0806 |

OTHER PUBLICATIONS

S2-173451 Nokia et al., "Maximum number of simultaneous slices registered per UE",SA WG2 Meeting #121 May 15-19, 2017, Hangzhou, China,total 6 pages.

Huawei, HiSilicon, Proposed corrections to 38.300 mainly on RRC_INACTIVE state, R2-1709833, 3GPP TSG-RAN WG2#99 , Berlin, Germany, Aug. 21-25, 2017 , 12 pages.

S2-180412 Ericsson,"Registration Procedure for N1 capable CPE on Wireline Access",SA WG2 Meeting #125,Jan. 22-26, 2018, Gothenburg, Sweden,total 3 pages.

Huawei, (TP for NR BL CR for TS 38.470): Correction to attribute of S-NSSAI, R3-181902, 3GPP TSG-RAN3 Meeting#99bis, Sanya, China, Apr. 16-20, 2018, 2 pages.

Nokia, Nokia Shanghai Bell, Pseudo-CR on TR clean up 3GPP TSG CT4 Meeting #81, Reno, US; Nov. 27 Dec. 1, 2017, C4-176239, 19 pages.

* cited by examiner

SESSION ESTABLISHMENT METHOD, RELAY DEVICE SELECTION METHOD, REGISTRATION METHOD, AND DEVICE

CROSS-REFERENCE TO RELATED APPLICATIONS

This application is a national stage of International Application No. PCT/CN2018/084477, filed on Apr. 25, 2018, which is herein incorporated by reference in its entirety.

TECHNICAL FIELD

This application relates to the field of communications technologies, and in particular, to a session establishment method, a relay device selection method, a registration method, and a device.

BACKGROUND

With continuous development of 5G communications technologies, to provide services for more users, an operator expects that a 5G core network can accommodate more different access network technologies. In addition to a radio access network (RAN) including a conventional base station, for example, a 4G E-UTRAN (Evolved UMTS Terrestrial Radio Access Network) or 5G new radio (NR), a wired broadband access technology may also be integrated into a 5G core network. Once the wired broadband access technology is integrated into the 5G core network, the operator can provide a 5G service in any place with a wireless fidelity (Wi-Fi) connection or broadband coverage.

For a wired broadband access network, an access point (AP) or customer premises equipment (CPE) usually accesses wired broadband, and then the AP or the CPE converts a signal into a wireless signal, for example, a Wi-Fi signal or a device to device (D2D) signal. User equipment (UE) connects to the AP or the CPE by using the wireless signal.

After the wired broadband access technology is integrated into the 5G core network, the UE can exchange signaling and transmit data with a core network through the wired broadband access network. For example, the UE accesses the CPE, and the CPE accesses the core network through a RAN, so that the UE exchanges signaling and transmits data with the core network.

In a 5G architecture, a physical resource is divided into a plurality of virtual networks based on different service requirements such as latency, bandwidth, security, and reliability, and each virtual network is a network slice. Each session belongs to one network slice, and sessions in different network slices need to use different network resources. The UE may obtain, through a registration process, allowed single-network slice selection assistance information (S-NSSAI) of the UE, and the UE can establish a session only in an identified network slice in the allowed S-NSSAI of the UE. The CPE may also obtain, through a registration process, allowed S-NSSAI of the CPE. If the UE accesses the RAN by using the CPE, a data transmission channel between the CPE and the RAN, that is, a data resource bearer (DRB), needs to be used for signaling exchange and data transmission between the UE and the core network. When the CPE does not support a network slice required by the UE, if the UE accesses a network by using the CPE, some services of the UE cannot be used because different network slices cannot share a DRB.

SUMMARY

Embodiments of this application provide a session establishment method, a relay device selection method, a registration method, a device, and a system, so that UE can establish a session in a network slice by using a relay device, thereby improving a success rate of establishing a session in the network slice by the UE by using the relay device.

To achieve the foregoing objective, the following technical solutions are used in the embodiments of this application.

According to a first aspect, this application provides a session establishment method and apparatus.

In an embodiment, the method may include: receiving, by an access network device, a first message sent by user equipment UE, where the first message includes a first session establishment request message and S-NSSAI that is requested by the UE; sending, by the access network device, a first reconfiguration request message to the UE, where the first reconfiguration request message includes a first session establishment response message and DRB configuration information, and the DRB configuration information is information about a DRB corresponding to the S-NSSAI; and sending, by the access network device, a second reconfiguration request message to a relay device, where the second reconfiguration request message includes the DRB configuration information and a UE identity. In the method, the access network device selects a relay device for the UE, transmits signaling and/or data for the UE on a DRB that is in a network slice and that is requested by the UE, and notifies the UE and the relay device by using a reconfiguration request message. In this way, the UE can establish a session in a network slice by using the relay device.

In an embodiment, before sending the first reconfiguration request message to the UE, the access network device sends a third reconfiguration request message to the relay device to indicate the relay device to establish the DRB corresponding to the S-NSSAI requested by the UE. In this implementation, if no DRB exists in a slice requested by the UE, a DRB of the relay device in the slice is established, to transmit signaling and/or data of the UE.

In an embodiment, before receiving the first message sent by the UE, the access network device receives a second message sent by the relay device, where the second message includes a second session establishment request message and the S-NSSAI that is requested by the UE; and sending, by the access network device, a fourth reconfiguration request message to the relay device, where the fourth reconfiguration request message includes a second session establishment response message. In this implementation, if no session is established for the relay device in a slice requested by the UE, a session for the relay device is established in the slice. A DRB corresponding to the session of the relay device in the slice may be used to transmit signaling and/or data of the UE.

Correspondingly, this application further provides a session establishment apparatus. The apparatus can implement the session establishment method according to the first aspect. For example, the apparatus may be an access network device or a chip applied to an access network device, or may be another apparatus that can implement the foregoing session establishment method. The apparatus may implement the foregoing method by using software, hardware, or hardware executing corresponding software.

In an embodiment, the apparatus may include a processor and a memory. The processor is configured to support the apparatus in performing a corresponding function in the method according to the first aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include a receiving module and a sending module. The receiving module is configured to receive a first message sent by user equipment UE, where the first message includes a first session establishment request message and S-NSSAI that is requested by the UE. The sending module is configured to send a first reconfiguration request message to the UE, where the first reconfiguration request message includes a first session establishment response message and DRB configuration information, and the DRB configuration information is information about a DRB corresponding to the S-NSSAI. The access network device sends a second reconfiguration request message to a relay device, where the second reconfiguration request message includes the DRB configuration information and a UE identity of the UE.

In an embodiment, the sending module is further configured to: before the access network device sends the first reconfiguration request message to the UE, send a third reconfiguration request message to the relay device, to indicate the relay device to establish the DRB corresponding to the S-NSSAI requested by the UE.

In an embodiment, the receiving module is further configured to: before the access network device receives the first message sent by the UE, receive a second message sent by the relay device, where the second message includes a second session establishment request message and the S-NSSAI that is requested by the UE; and the sending module is further configured to send a fourth reconfiguration request message to the relay device, where the fourth reconfiguration request message includes a second session establishment response message.

According to a second aspect, this application provides a session establishment method and apparatus.

In an embodiment, the method may include: receiving, by a relay device, a reconfiguration request message sent by an access network device, where the reconfiguration request message includes DRB configuration information and a UE identity of UE, and the DRB configuration information is information about a DRB corresponding to S-NSSAI requested by the UE; and transmitting, by the relay device, signaling and/or data of the UE on the DRB corresponding to the DRB configuration information. In the method, the relay device transmits the signaling and/or data for the UE according to an indication of the access network device on a DRB in a network slice requested by the UE. In this way, the UE can establish a session in a network slice by using the relay device.

In an embodiment, before receiving the reconfiguration request message sent by the access network device, the relay device receives a third reconfiguration request message sent by the access network device, to indicate the relay device to establish the DRB corresponding to the S-NSSAI requested by the UE. In this implementation, if no DRB exists in a slice requested by the UE, a DRB of the relay device in the slice is established, to transmit signaling and/or data of the UE.

In an embodiment, before receiving the reconfiguration request message sent by the access network device, the relay device receives a first request message sent by the UE, where the first request message includes the S-NSSAI requested by the UE; and then, the relay device sends a first response message to the UE, where the first response message includes first indication information, and the first indication information is used to indicate that the relay device has successfully established a session in the S-NSSAI. In this way, if the relay device determines that a session exists in the slice requested by the UE, the relay device may notify the UE, so that the UE determines that the relay device has a session in the slice, and a session of the UE in the slice can be established.

In an embodiment, before sending the first response message to the UE, the relay device performs determining. If no session is established for the relay device in the S-NSSAI requested by the UE, the relay device sends a second message to the access network device, where the second message includes a session establishment request message and the S-NSSAI requested by the UE. The relay device receives a fourth reconfiguration request message sent by the access network device, where the fourth reconfiguration request message includes a second session establishment response message. In this implementation, if no session is established for the relay device in a slice requested by the UE, a session for the relay device is established in the slice. A DRB corresponding to the session of the relay device in the slice may be used to transmit signaling and/or data of the UE.

Correspondingly, this application further provides a session establishment apparatus. The apparatus can implement the session establishment method according to the second aspect. For example, the apparatus may be a relay device or a chip applied to a relay device, or may be another apparatus that can implement the foregoing session establishment method. The apparatus may implement the foregoing method by using software, hardware, or hardware executing corresponding software.

In an embodiment, the apparatus may include a processor and a memory. The processor is configured to support the apparatus in performing a corresponding function in the method according to the second aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include a receiving module and a processing module. The receiving module is configured to receive a reconfiguration request message sent by an access network device, where the reconfiguration request message includes DRB configuration information and a UE identity of UE, and the DRB configuration information is information about a DRB corresponding to S-NSSAI requested by the UE. The processing module is configured to transmit signaling and/or data of the UE on the DRB corresponding to the DRB configuration information.

In an embodiment, the receiving module is further configured to: before receiving the reconfiguration request message sent by the access network device, receive a third reconfiguration request message sent by the access network device, to indicate the relay device to establish the DRB corresponding to the S-NSSAI requested by the UE.

In an embodiment, the receiving module is further configured to: before receiving the reconfiguration request message sent by the access network device, receive a first request message sent by the UE, where the first request message includes the S-NSSAI requested by the UE; and the apparatus may further include a sending module, configured to send a first response message to the UE, where the first response message includes first indication information, and the first indication information is used to indicate that the relay device has successfully established a session in the S-NSSAI.

In an embodiment, the processing module is further configured to determine whether a session is established for the relay device in the S-NSSAI requested by the UE; if the processing module determines that no session is established in the S-NSSAI requested by the UE, the sending module is further configured to send a second message to the access network device before sending the first response message to the UE, where the second message includes a session establishment request message and the S-NSSAI requested by the UE; and the receiving module is further configured to receive a fourth reconfiguration request message sent by the access network device, where the fourth reconfiguration request message includes a second session establishment response message.

According to a third aspect, this application provides a session establishment method and apparatus.

In an embodiment, the method may include: sending, by UE, a first message to an access network device, where the first message includes a first session establishment request message and S-NSSAI that is requested by the UE; receiving, by the UE, a first reconfiguration request message sent by the access network device, where the first reconfiguration request message includes a first session establishment response message and DRB configuration information, and the DRB configuration information is information about a DRB corresponding to the S-NSSAI; and transmitting, by the UE, signaling and/or data on the DRB corresponding to the DRB configuration information. In the method, the UE transmits, by using the relay device, the signaling and/or data for the UE according to an indication of the access network device on a DRB in a network slice requested by the UE. In this way, the UE can establish a session in a network slice by using the relay device.

In an embodiment, before sending the first message to the access network device, the UE sends a first request message to the relay device, where the first request message includes the S-NSSAI requested by the UE; and receiving, by the UE, a first response message sent by the relay device, where the first response message includes first indication information, and the first indication information is used to indicate that the relay device has successfully established a session in the S-NSSAI. In this implementation, if no session is established for the relay device in a slice requested by the UE, a session for the relay device is established in the slice. A DRB corresponding to the session of the relay device in the slice may be used to transmit signaling and/or data of the UE.

Correspondingly, this application further provides a session establishment apparatus. The apparatus can implement the session establishment method according to the third aspect. For example, the apparatus may be user equipment or a chip applied to user equipment, or may be another apparatus that can implement the foregoing session establishment method. The apparatus may implement the foregoing method by using software, hardware, or hardware executing corresponding software.

In an embodiment, the apparatus may include a processor and a memory. The processor is configured to support the apparatus in performing a corresponding function in the method according to the third aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include a sending module, a receiving module, and a processing module. The sending module is configured to send a first message to an access network device, where the first message includes a first session establishment request message and S-NSSAI that is requested by UE. The receiving module is configured to receive a first reconfiguration request message sent by the access network device, where the first reconfiguration request message includes a first session establishment response message and DRB configuration information, and the DRB configuration information is information about a DRB corresponding to the S-NSSAI. The processing module is configured to transmit signaling and/or data on the DRB corresponding to the DRB configuration information.

In an embodiment, the sending module is further configured to: before sending the first message to the access network device, send a first request message to a relay device, where the first request message includes the S-NSSAI requested by the UE; and the receiving module is further configured to receive a first response message sent by the relay device, where the first response message includes first indication information, and the first indication information is used to indicate that the relay device has successfully established a session in the S-NSSAI.

According to a fourth aspect, this application provides a relay device selection method and apparatus.

In an embodiment, the method may include: obtaining, by user equipment, M pieces of first indication information, where each of the M pieces of first indication information is used to indicate one allowed network slice of the UE, and M is a positive integer greater than or equal to 1; receiving, by the UE, first messages sent by L relay devices, where the first message of one relay device includes N pieces of second indication information, and each of the N pieces of second indication information is used to indicate one allowed network slice of the relay device, and L and N are positive integers greater than or equal to 1; and selecting, by the UE, a random first relay device as a target relay device based on the M pieces of first indication information and the L pieces of first messages, where network slices indicated by the N pieces of second indication information of the first relay device include at least one network slice indicated by the M pieces of first indication information. In the method, after the UE and the relay devices respectively obtain allowed network slices of the UE and the relay devices, at least one relay device notifies, by using a message, the UE of allowed network slice(s) of the at least one relay device. The UE selects a target relay device, and establishes a connection to the target relay device. The allowed network slice(s) of the target relay device include at least one allowed network slice of the UE. Therefore, a probability that the relay device accessed by the UE supports the network slice required the UE can be increased, and a success rate of establishing a session in the network slice by the UE by using the relay device can be increased. In an implementation, if network slices indicated by N pieces of second indication information of a relay device completely include the network slices indicated by the M pieces of first indication information of the UE, the UE determines the relay device as the first relay device. In this way, it can be ensured that the relay device accessed by the UE completely supports the network slice required the UE, and the success rate of establishing a session by the UE by using the relay device can be increased.

In an embodiment, the first indication information and the second indication information each are a relay service code RSC.

In an embodiment, a method for obtaining the M pieces of first indication information by the UE includes: preconfiguring, for the UE, S pieces of S-NSSAI and RSCs in a one-to-one correspondence with the S pieces of S-NSSAI, where S is a positive integer greater than or equal to M; sending, by the UE, a first registration request message to an AMF entity, where the first registration request message includes one or more pieces of S-NSSAI requested by the UE; receiving, by the UE, a first registration response message sent by the AMF entity, where the first registration response message includes one or more pieces of allowed S-NSSAI of the UE; and querying, by the UE, first information based on the one or more pieces of allowed S-NSSAI of the UE, to obtain the M pieces of first indication information.

In an embodiment, a method for obtaining the M pieces of first indication information by the UE includes: sending, by the UE, a second registration request message to an AMF entity, where the second registration request message includes one or more pieces of S-NSSAI requested by the UE; receiving, by the UE, a second registration response message sent by the AMF entity, where the second registration response message includes one or more pieces of allowed S-NSSAI of the UE and RSCs in a one-to-one correspondence with the one or more pieces of allowed S-NSSAI of the UE; and obtaining, by the UE, the M pieces of first indication information based on the one or more pieces of allowed S-NSSAI of the UE and the RSCs in a one-to-one correspondence with the one or more pieces of allowed S-NSSAI of the UE.

In an embodiment, after selecting a random first relay device as the target relay device based on the M pieces of first indication information and the L pieces of first messages, the UE establishes a connection to the target relay device.

Correspondingly, this application further provides a relay device selection apparatus. The apparatus can implement the relay device selection method according to the fourth aspect. For example, the apparatus may be user equipment or a chip applied to user equipment, or may be another apparatus that can implement the foregoing relay device selection method. The apparatus may implement the foregoing method by using software, hardware, or hardware executing corresponding software.

In an embodiment, the apparatus may include a processor and a memory. The processor is configured to support the apparatus in performing a corresponding function in the method according to the fourth aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include an obtaining module, a receiving module, and a processing module. The obtaining module is configured to obtain M pieces of first indication information, where each of the M pieces of first indication information is used to indicate one allowed network slice of the UE, and M is a positive integer greater than or equal to 1. The receiving module is configured to receive first messages sent by L relay devices, where the first message of one relay device includes N pieces of second indication information, each of the N pieces of second indication information is used to indicate one allowed network slice of the relay device, and L and N are positive integers greater than or equal to 1. The processing module is configured to select a random first relay device as a target relay device based on the M pieces of first indication information and the L pieces of first messages, where network slices indicated by the N pieces of second indication information of the first relay device include at least one network slice indicated by the M pieces of first indication information.

In an embodiment, the first indication information and the second indication information each are an RSC.

In an embodiment, the UE is preconfigured with S pieces of S-NSSAI and RSCs in a one-to-one correspondence with the S pieces of S-NSSAI, where S is a positive integer greater than or equal to M. The apparatus further includes a sending module, configured to send a first registration request message to an AMF entity, where the first registration request message includes one or more pieces of S-NSSAI requested by the UE. The receiving module is configured to receive a first registration response message sent by the AMF entity, where the first registration response message includes one or more pieces of allowed S-NSSAI of the UE. That the obtaining module obtains M pieces of first indication information includes: the obtaining module queries, based on the one or more pieces of allowed S-NSSAI of the UE that are received by the receiving module, first information preconfigured for the UE, to obtain the M pieces of first indication information.

In an embodiment, the apparatus further includes a sending module, configured to send a second registration request message to an AMF entity, where the second registration request message includes one or more pieces of S-NSSAI requested by the UE. The receiving module is configured to receive a second registration response message sent by the AMF entity, where the second registration response message includes one or more pieces of allowed S-NSSAI of the UE and RSCs in a one-to-one correspondence with the one or more pieces of allowed S-NSSAI of the UE. The obtaining module is configured to obtain the M pieces of first indication information based on the one or more pieces of allowed S-NSSAI of the UE and the RSCs in a one-to-one correspondence with the one or more pieces of allowed S-NSSAI of the UE.

In an embodiment, the processing module is configured to: after selecting a random first relay device as the target relay device based on the M pieces of first indication information and the L pieces of first messages, establish a connection to the target relay device.

According to a fifth aspect, this application provides a relay device selection method and apparatus.

In an embodiment, the method may include: obtaining, by each of L relay devices, N pieces of indication information; and sending, by each of the L relay devices, a first message to user equipment UE, where the first message of one relay device includes the N pieces of indication information, the first message is used to indicate the UE to select a random first relay device in the L relay devices as a target relay device based on M pieces of first indication information and the L pieces of first messages, L is a positive integer greater than or equal to 1, one piece of indication information is used to indicate one allowed network slice of the relay device, N is a positive integer greater than or equal to 1, one piece of first indication information is used to indicate one allowed network slice of the UE, M is a positive integer greater than or equal to 1, and network slices indicated by the N pieces of indication information of the first relay device include at least one network slice indicated by the M pieces of first indication information. In the method, after the UE and the relay devices respectively obtain allowed network slices of the UE and the relay devices, at least one relay device notifies, by using a message, the UE of allowed network slice(s) of the at least one relay device. The UE selects a target relay device, and establishes a connection to the target relay device. The allowed network slice(s) of the target relay device include at least one allowed network slice of the UE. Therefore, a probability that the relay device accessed by the UE supports the network slice required the UE can be increased, and a success rate of establishing a session in the network slice by the UE by using the relay device can be increased.

In an embodiment, the first indication information and the second indication information each are an RSC.

In an embodiment, the obtaining, by each of L relay devices, N pieces of indication information includes: pre-configuring first information for the relay device, where the first information includes S pieces of S-NSSAI and RSCs in a one-to-one correspondence with the S pieces of S-NSSAI, and S is a positive integer greater than or equal to M; sending, by the relay device, a first registration request message to an AMF entity, where the first registration request message includes one or more pieces of S-NSSAI requested by the relay device; receiving, by the relay device, a first registration response message sent by the AMF entity, where the first registration response message includes one or more pieces of allowed S-NSSAI of the relay device; and querying, by the relay device, the first information based on the one or more pieces of allowed S-NSSAI of the relay device, to obtain the N pieces of indication information.

In an embodiment, the obtaining, by each of L relay devices, N pieces of indication information includes: sending, by the relay device, a second registration request message to an AMF entity, where the second registration request message includes one or more pieces of S-NSSAI requested by the relay device; receiving, by the relay device, a second registration response message sent by the AMF entity, where the second registration response message includes one or more pieces of allowed S-NSSAI of the relay device and RSCs in a one-to-one correspondence with the one or more pieces of allowed S-NSSAI of the relay device; and obtaining, by the relay device, the N pieces of indication information based on the one or more pieces of allowed S-NSSAI of the relay device and the RSCs in a one-to-one correspondence with the one or more pieces of allowed S-NSSAI of the relay device.

Correspondingly, this application further provides a relay device selection apparatus. The apparatus can implement the relay device selection method according to the fifth aspect. For example, the apparatus may be a relay device or a chip applied to a relay device, or may be another apparatus that can implement the foregoing relay device selection method. The apparatus may implement the foregoing method by using software, hardware, or hardware executing corresponding software.

In an embodiment, the apparatus may include a processor and a memory. The processor is configured to support the apparatus in performing a corresponding function in the method according to the fifth aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include an obtaining module and a sending module. The obtaining module is configured to obtain respective N pieces of indication information, where one piece of indication information is used to indicate one allowed network slice of the relay device, and N is a positive integer greater than or equal to 1. The sending module is configured to send a first message to user equipment UE, where the first message includes the N pieces of indication information, the first message is used to indicate the UE to select a random first relay device in L relay devices as a target relay device based on M pieces of first indication information and L pieces of first messages, L is a positive integer greater than or equal to 1, one piece of first indication information is used to indicate one allowed network slice of the UE, M is a positive integer greater than or equal to 1, and network slices indicated by the N pieces of indication information of the first relay device include at least one network slice indicated by the M pieces of first indication information.

In an embodiment, the first indication information and the second indication information each are an RSC.

In an embodiment, the relay device is preconfigured with first information, where the first information includes S pieces of S-NSSAI and RSCs in a one-to-one correspondence with the S pieces of S-NSSAI, and S is a positive integer greater than or equal to M. The sending module is configured to send a first registration request message to an AMF entity, where the first registration request message includes one or more pieces of S-NSSAI requested by the relay device. The apparatus further includes a receiving module, and the receiving module is configured to receive a first registration response message sent by the AMF entity, where the first registration response message includes one or more pieces of allowed S-NSSAI of the relay device. The obtaining module is configured to query, based on the one or more pieces of allowed S-NSSAI of the relay device that are received by the receiving module, the first information preconfigured for the relay device, to obtain the N pieces of indication information.

In an embodiment, the sending module is configured to send a second registration request message to an AMF entity, where the second registration request message includes one or more pieces of S-NSSAI requested by the relay device. The apparatus further includes a receiving module, and the receiving module is configured to receive a second registration response message sent by the AMF entity, where the second registration response message includes one or more pieces of allowed S-NSSAI of the relay device and RSCs in a one-to-one correspondence with the one or more pieces of allowed S-NSSAI of the relay device. The obtaining module is configured to obtain the N pieces of indication information based on the one or more pieces of allowed S-NSSAI of the relay device and the RSCs in a one-to-one correspondence with the one or more pieces of allowed S-NSSAI of the relay device.

According to a sixth aspect, this application provides a relay device selection method and apparatus.

In an embodiment, the method may include: obtaining, by user equipment, M pieces of first indication information, where each of the M pieces of first indication information is used to indicate one allowed network slice of the UE, and M is a positive integer greater than or equal to 1; receiving, by the UE, a first message sent by a first relay device, where the first message includes N pieces of second indication information, each of the N pieces of second indication information is used to indicate one allowed network slice of a relay device, and N is a positive integer greater than or equal to 1; and when network slices indicated by the N pieces of second indication information include at least one network slice indicated by the M pieces of first indication information, determining, by the UE, the first relay device as a target relay device. In the method, after the UE and the relay device respectively obtain the allowed network slices of the UE and the relay device, the first relay device notifies, by using the first message, the UE of allowed network slice(s) of the first relay device. If the allowed network slice(s) of the first relay device include at least one allowed network slice of the UE, the UE determines the first relay device as the target relay device, and establishes a connection to the target relay device. According to this method, a probability that the relay device accessed by the UE supports the network slice required the UE can be increased, and a success rate of establishing a session in the network slice by the UE by using the relay device can be increased. In an implementation, if the network slices indicated by the N pieces of second indication information of the first relay device completely include the network slices indicated by the M pieces of first indication information of the UE, the UE determines the first relay device as the target relay device. In this way, it can be ensured that the relay device accessed by the UE completely supports the network slice required the UE, and the success rate of establishing a session by the UE by using the relay device can be increased.

In an embodiment, the first indication information and the second indication information each are a relay service code RSC.

In an embodiment, the UE is preconfigured with first information, where the first information includes S pieces of S-NSSAI and RSCs in a one-to-one correspondence with the S pieces of S-NSSAI, and S is a positive integer greater than or equal to M. Before obtaining the M pieces of first indication information, the UE sends a first registration request message to an AMF entity, where the first registration request message includes one or more pieces of S-NSSAI requested by the UE; and receives a first registration response message sent by the AMF entity, where the first registration response message includes one or more pieces of allowed S-NSSAI of the UE. Subsequently, the UE obtains the M pieces of first indication information based on the one or more pieces of allowed S-NSSAI of the UE and the first information.

In an embodiment, the UE sends a second registration request message to an AMF entity, where the second registration request message includes one or more pieces of S-NSSAI requested by the UE; the UE receives a second registration response message sent by the AMF entity, where the second registration response message includes one or more pieces of allowed S-NSSAI of the UE and RSCs in a one-to-one correspondence with the one or more pieces of allowed S-NSSAI of the UE; and the UE obtains the M pieces of first indication information based on the one or more pieces of allowed S-NSSAI of the UE and the RSCs in a one-to-one correspondence with the one or more pieces of allowed S-NSSAI of the UE.

In an embodiment, after determining the first relay device as the target relay device, the UE establishes a connection to the target relay device.

Correspondingly, this application further provides a relay device selection apparatus. The apparatus can implement the relay device selection method according to the sixth aspect. For example, the apparatus may be user equipment or a chip applied to user equipment, or may be another apparatus that can implement the foregoing relay device selection method. The apparatus may implement the foregoing method by using software, hardware, or hardware executing corresponding software.

In an embodiment, the apparatus may include a processor and a memory. The processor is configured to support the apparatus in performing a corresponding function in the method according to the sixth aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include an obtaining module, a receiving module, and a processing module. The obtaining module is configured to obtain M pieces of first indication information, where each of the M pieces of first indication information is used to indicate one allowed network slice of UE, and M is a positive integer greater than or equal to 1. The receiving module is configured to receive a first message sent by a first relay device, where the first message includes N pieces of second indication information, each of the N pieces of second indication information is used to indicate one allowed network slice of a relay device, and N is a positive integer greater than or equal to 1. The processing module is configured to: when network slices indicated by the N pieces of second indication information include at least one network slice indicated by the M pieces of first indication information, determine the first relay device as a target relay device.

In an embodiment, each of the M pieces of first indication information and each of the N pieces of second indication information is a relay service code RSC.

In an embodiment, the UE is preconfigured with first information, where the first information includes S pieces of S-NSSAI and RSCs in a one-to-one correspondence with the S pieces of S-NSSAI, and S is a positive integer greater than or equal to M. The apparatus further includes a sending module, configured to send a first registration request message to an AMF entity, where the first registration request message includes one or more pieces of S-NSSAI requested by the UE. The receiving module is further configured to receive a first registration response message sent by the AMF entity, where the first registration response message includes one or more pieces of allowed S-NSSAI of the UE. That the obtaining module obtains M pieces of first indication information includes: obtaining the M pieces of first indication information based on the one or more pieces of allowed S-NSSAI of the UE that are received by the receiving module and the configured first information.

In an embodiment, the apparatus further includes a sending module, configured to send a second registration request message to an AMF entity, where the second registration request message includes one or more pieces of S-NSSAI requested by the UE. The receiving module is configured to receive a second registration response message sent by the AMF entity, where the second registration response message includes one or more pieces of allowed S-NSSAI of the UE and RSCs in a one-to-one correspondence with the one or more pieces of allowed S-NSSAI of the UE. The obtaining module is configured to obtain the M pieces of first indication information based on the one or more pieces of allowed S-NSSAI of the UE and the RSCs in a one-to-one correspondence with the one or more pieces of allowed S-NSSAI of the UE.

In an embodiment, the processing module is further configured to: after determining the first relay device as the target relay device, establish a connection to the target relay device.

According to a seventh aspect, this application provides a relay device selection method and apparatus.

In an embodiment, the method may include: obtaining, by a first relay device, N pieces of indication information; and sending, by the first relay device, a first message to user equipment UE, where the first message includes the N pieces of indication information, and is used to indicate the UE to determine, based on M pieces of first indication information and the N pieces of indication information, whether the first relay device is a target relay device, one piece of indication information is used to indicate one allowed network slice of the first relay device, N is a positive integer greater than or equal to 1, one piece of first indication information is used to indicate one allowed network slice of the UE, M is a positive integer greater than or equal to 1, and network slices indicated by the N pieces of indication information of the target relay device include at least one network slice indicated by the M pieces of first indication information. In the method, after the UE and a relay device respectively obtain allowed network slices of the UE and the relay device, the first relay device notifies, by using the first message, the UE of allowed network slice(s) of the first relay device. If the allowed network slice(s) of the first relay device include at least one allowed network slice of the UE, the UE determines the first relay device as the target relay device, and establishes a connection to the target relay device. According to this method, a probability that the relay device accessed by the UE supports the network slice required the UE can be increased, and a success rate of establishing a session in the network slice by the UE by using the relay device can be increased.

In an embodiment, the first indication information and the second indication information each are an RSC.

In an embodiment, the first relay device is preconfigured with first information, where the first information includes S pieces of S-NSSAI and RSCs in a one-to-one correspondence with the S pieces of S-NSSAI, and S is a positive integer greater than or equal to M. The first relay device sends a first registration request message to an AMF entity, where the first registration request message includes one or more pieces of S-NSSAI requested by the first relay device. The first relay device receives a first registration response message sent by the AMF entity, where the first registration response message includes one or more pieces of allowed S-NSSAI of the first relay device. The first relay device queries the first information based on the one or more pieces of allowed S-NSSAI of the first relay device, to obtain the N pieces of indication information.

In an embodiment, the first relay device sends a second registration request message to an AMF entity, where the second registration request message includes one or more pieces of S-NSSAI requested by the first relay device. The first relay device receives a second registration response message sent by the AMF entity, where the second registration response message includes one or more pieces of allowed S-NSSAI of the first relay device and RSCs in a one-to-one correspondence with the one or more pieces of allowed S-NSSAI of the relay device. The first relay device obtains the N pieces of indication information based on the one or more pieces of allowed S-NSSAI of the first relay device and the RSCs in a one-to-one correspondence with the one or more pieces of allowed S-NSSAI of the first relay device.

Correspondingly, this application further provides a relay device selection apparatus. The apparatus can implement the relay device selection method according to the seventh aspect. For example, the apparatus may be a relay device or a chip applied to a relay device, or may be another apparatus that can implement the foregoing relay device selection method. The apparatus may implement the foregoing method by using software, hardware, or hardware executing corresponding software.

In an embodiment, the apparatus may include a processor and a memory. The processor is configured to support the apparatus in performing a corresponding function in the method according to the seventh aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include an obtaining module and a sending module. The obtaining module is configured to N pieces of indication information, where one piece of indication information is used to indicate one allowed network slice of a first relay device, and N is a positive integer greater than or equal to 1. The sending module is configured to send a first message to user equipment UE, where the first message includes the N pieces of indication information, and is used to indicate the UE to determine, based on M pieces of first indication information and the N pieces of indication information, whether the first relay device is a target relay device, where one piece of first indication information is used to indicate one allowed network slice of the UE, M is a positive integer greater than or equal to 1, and network slices indicated by the N pieces of indication information of the target relay device include at least one network slice indicated by the M pieces of first indication information.

In an embodiment, the first indication information and the second indication information each are an RSC.

In an embodiment, the first relay device is preconfigured with first information, where the first information includes S pieces of S-NSSAI and RSCs in a one-to-one correspondence with the S pieces of S-NSSAI, and S is a positive integer greater than or equal to M. The sending module is configured to send a first registration request message to an AMF entity, where the first registration request message includes one or more pieces of S-NSSAI requested by the first relay device. The apparatus further includes a receiving module, and the receiving module is configured to receive a first registration response message sent by the AMF entity, where the first registration response message includes one or more pieces of allowed S-NSSAI of the first relay device. The obtaining module is configured to query, based on the one or more pieces of allowed S-NSSAI of the first relay device that are received by the receiving module, the first information preconfigured for the first relay device, to obtain the N pieces of indication information.

In an embodiment, the sending module is configured to send a second registration request message to an AMF entity, where the second registration request message includes one or more pieces of S-NSSAI requested by the first relay device. The apparatus further includes a receiving module, and the receiving module is configured to receive a second registration response message sent by the AMF entity, where the second registration response message includes one or more pieces of allowed S-NSSAI of the first relay device and RSCs in a one-to-one correspondence with the one or more pieces of allowed S-NSSAI of the first relay device. The obtaining module is configured to obtain the N pieces of indication information based on the one or more pieces of allowed S-NSSAI of the first relay device and the RSCs in a one-to-one correspondence with the one or more pieces of allowed S-NSSAI of the first relay device.

According to an eighth aspect, this application provides a registration method and apparatus.

In an embodiment, the method may include: sending, by a relay device, a registration request message to an AMF entity, where the registration request message includes first indication information, the first indication information is used to indicate the AMF entity to update first network slice information, and the first network slice information is used to indicate one or more pieces of allowed S-NSSAI of the relay device; and receiving, by the relay device, a registration response message sent by the AMF entity, where the registration response message includes the first network slice information. In this method, the relay device indicates the AMF entity to update the one or more pieces of allowed S-NSSAI of the relay device; and the AMF entity updates, based on one or more pieces of allowed S-NSSAI of UE, the one or more pieces of allowed S-NSSAI of the relay device. The UE may establish a session in an allowed network slice of the relay device, so that a success rate of establishing a session by the UE in the network slice by using the relay device can be increased.

In an embodiment, before sending the registration request message to the AMF entity, the relay device establishes a connection to the user equipment UE, and receives first information sent by the UE, where the first information is a UE identity or second network slice information, and the second network slice information is used to indicate the one or more pieces of allowed S-NSSAI of the UE.

In an embodiment, if the first information is the second network slice information, the registration request message further includes the second network slice information. In this implementation, the UE directly notifies the relay device of the one or more pieces of allowed S-NSSAI of the UE. The relay device sends, to the AMF entity, the registration request message carrying the one or more pieces of allowed S-NSSAI of the UE. The AMF entity may directly update, based on the one or more pieces of allowed S-NSSAI of the UE in the message, the one or more pieces of allowed S-NSSAI of the relay device.

In an embodiment, after receiving the registration response message sent by the AMF entity, the relay device sends a first message to the UE, where the first message includes the first network slice information. In this way, the relay device notifies the UE of the updated one or more pieces of allowed S-NSSAI of the relay device, and the UE can establish a session in an allowed slice of the relay device.

Correspondingly, this application further provides a registration apparatus. The apparatus can implement the registration method according to the eighth aspect. For example, the apparatus may be a relay device or a chip applied to a relay device, or may be another apparatus that can implement the foregoing registration method. The apparatus may implement the foregoing method by using software, hardware, or hardware executing corresponding software.

In an embodiment, the apparatus may include a processor and a memory. The processor is configured to support the apparatus in performing a corresponding function in the method according to the eighth aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include a sending module and a receiving module. The sending module is configured to send a registration request message to an AMF entity, where the registration request message includes first indication information, the first indication information is used to indicate the AMF entity to update first network slice information, and the first network slice information is used to indicate one or more pieces of allowed S-NSSAI of the relay device. The receiving module is configured to receive a registration response message sent by the AMF entity, where the registration response message includes the first network slice information.

In an embodiment, the apparatus may further include a processing module, configured to: before the sending module sends the registration request message to the AMF entity, establish a connection to user equipment UE. The receiving module is further configured to receive first information sent by the UE, where the first information is a UE identity or second network slice information, and the second network slice information is used to indicate one or more pieces of allowed S-NSSAI of the UE.

In an embodiment, if the first information is the second network slice information, the registration request message further includes the second network slice information.

In an embodiment, the sending module is further configured to: after the receiving module receives the registration response message sent by the AMF entity, send a first message to the UE, where the first message includes the first network slice information.

According to a ninth aspect, this application provides a registration method and apparatus.

In an embodiment, the method may include: receiving, by an AMF entity, a registration request message sent by a relay device, where the registration request message includes first indication information, the first indication information is used to indicate the AMF entity to update first network slice information, and the first network slice information is used to indicate one or more pieces of allowed S-NSSAI of the relay device; and sending, by the AMF entity, a registration response message to the relay device, where the registration response message includes the first network slice information. In this method, the relay device indicates the AMF entity to update the one or more pieces of allowed S-NSSAI of the relay device; and the AMF entity updates, based on one or more pieces of allowed S-NSSAI of UE, the one or more pieces of allowed S-NSSAI of the relay device. The UE may establish a session in an allowed network slice of the relay device, so that a success rate of establishing a session by the UE in the network slice by using the relay device can be increased.

In an embodiment, the AMF entity obtains the one or more pieces of allowed S-NSSAI of the UE. The AMF entity updates the first network slice information based on an intersection set of the one or more pieces of allowed S-NSSAI of the UE and one or more pieces of S-NSSAI subscribed to by the relay device.

In another possible design, the AMF entity obtains the one or more pieces of allowed S-NSSAI of the UE. The AMF entity sends a first request message to an NSSF entity, where the first request message is used to request the NSSF entity to update the first network slice information, the first network slice information includes the one or more pieces of allowed S-NSSAI of the UE, one or more pieces of S-NSSAI subscribed to by the relay device, and second indication information, and the second indication information is used to indicate the NSSF entity to update the first network slice information. The AMF entity receives a first response message sent by the NSSF entity, where the first response message includes the first network slice information.

In an embodiment, the registration request message sent by the relay device includes a UE identity. That the AMF entity obtains the one or more pieces of allowed S-NSSAI of the UE includes: sending, by the AMF entity, a second request message to a first AMF entity, where the second request message includes the UE identity and third indication information, and the third indication information is used to indicate the first AMF entity to obtain the one or more pieces of allowed S-NSSAI of the UE; and receiving, by the AMF entity, a second response message sent by the first AMF entity, where the second response message includes the one or more pieces of allowed S-NSSAI of the UE. In this implementation, the registration request message carries relatively little content, and needs to include only the UE identity. The AMF entity needs to obtain, based on the UE identity, the one or more pieces of allowed S-NSSAI of the UE.

In another possible design, the registration request message sent by the relay device includes second network slice information, the second network slice information is used to indicate the one or more pieces of allowed S-NSSAI of the UE. That the AMF entity obtains the one or more pieces of allowed S-NSSAI of the UE includes: obtaining, by the AMF entity based on the second network slice information, the one or more pieces of allowed S-NSSAI of the UE. In this implementation, the AMF entity may directly obtain, from the registration request message, the one or more pieces of allowed S-NSSAI of the UE. The registration request message carries relatively large content, and the registration request message is relatively large.

Correspondingly, this application further provides a registration apparatus. The apparatus can implement the registration method according to the ninth aspect. For example, the apparatus may be an AMF entity or a chip applied to an AMF entity, or may be another apparatus that can implement the foregoing registration method. The apparatus may implement the foregoing method by using software, hardware, or hardware executing corresponding software.

In an embodiment, the apparatus may include a processor and a memory. The processor is configured to support the apparatus in performing a corresponding function in the method according to the ninth aspect. The memory is configured to couple to the processor, and stores a program instruction and data that are necessary for the apparatus. In addition, the apparatus may further include a communications interface, configured to support communication between the apparatus and another apparatus. The communications interface may be a transceiver or a transceiver circuit.

In an embodiment, the apparatus may include a sending module and a receiving module. The receiving module is configured to receive a registration request message sent by a relay device, where the registration request message includes first indication information, the first indication information is used to indicate the AMF entity to update first network slice information, and the first network slice information is used to indicate one or more pieces of allowed S-NSSAI of the relay device. The sending module is configured to send a registration response message to the relay device, where the registration response message includes the first network slice information.

In an embodiment, the apparatus may further include an obtaining module and a processing module. The obtaining module is configured to obtain one or more pieces of allowed S-NSSAI of user equipment UE. The processing module is configured to update the first network slice information based on an intersection set of the one or more pieces of allowed S-NSSAI of the UE and one or more pieces of S-NSSAI subscribed to by the relay device.

In another possible design, the apparatus may further include an obtaining module. The obtaining module is configured to obtain one or more pieces of allowed S-NSSAI of user equipment UE. The sending module is further configured to send a first request message to an NSSF entity, where the first request message is used to request the NSSF entity to update the first network slice information, the first network slice information includes the one or more pieces of allowed S-NSSAI of the UE, one or more pieces of S-NSSAI subscribed to by the relay device, and second indication information, and the second indication information is used to indicate the NSSF entity to update the first network slice information. The receiving module is further configured to receive a first response message sent by the NSSF entity, where the first response message includes the first network slice information.

In an embodiment, the registration request message includes a UE identity. The sending module is further configured to send a second request message to a first AMF entity, where the second request message includes the UE identity and third indication information, and the third indication information is used to indicate the first AMF entity to obtain the one or more pieces of allowed S-NSSAI of the UE. The receiving module is further configured to receive a second response message sent by the first AMF entity, where the second response message includes the one or more pieces of allowed S-NSSAI of the UE.

In another possible design, the registration request message includes second network slice information, and the second network slice information is used to indicate the one or more pieces of allowed S-NSSAI of the UE. The obtaining module is configured to obtain, based on the second network slice information, the one or more pieces of allowed S-NSSAI of the UE.

This application further provides a computer-readable storage medium. The computer-readable storage medium stores an instruction. When the instruction is run on a computer, the computer is enabled to perform the method according to any one of the foregoing aspects.

This application further provides a computer program product including an instruction. When the instruction is run on a computer, the computer is enabled to perform the method according to any one of the foregoing aspects.

This application further provides a chip system. The chip system includes a processor, and may further include a memory, configured to implement the method according to any one of the foregoing aspects.

This application provides a communications system. The system includes the apparatus configured to implement the method according to the first aspect, the apparatus configured to implement the method according to the second aspect, the fifth aspect, the seventh aspect, or the eighth aspect, the apparatus configured to implement the method according to the third aspect, the fourth aspect, or the sixth aspect, and the apparatus configured to implement the method according to the ninth aspect.

Any apparatus, computer storage medium, computer program product, chip system, or communications system provided above is configured to perform the corresponding method provided above. Therefore, for beneficial effects that can be achieved by the apparatus, computer storage medium, computer program product, chip system, or communications system provided above, refer to beneficial effects of a corresponding solution in the corresponding method provided above. Details are not described herein again.

DESCRIPTION OF EMBODIMENTS

A session establishment method, a relay device selection method, a registration method, a device, and a system that are provided in embodiments of this application are described in detail below with reference to the accompanying drawings.

Technical solutions provided in this application may be applied to various communications systems in which network slices are obtained through division. For example, a network slice, a 5G NR system, a future evolved system, or a plurality of communications convergence systems are obtained through division based on an existing communications system. There may be a plurality of application scenarios, for example, a machine-to-machine (M2M) scenario, a D2M scenario, a macro-micro communication scenario, an enhanced mobile broadband (eMBB) scenario, an ultra-reliable & low-latency communication (URLLC) scenario, and a massive machine-type communication (mMTC) scenario. The scenarios may include but are not limited to a scenario of communication between UEs, a scenario of communication between network devices, a scenario of communication between a network device and UE, and the like. The technical solutions provided in the embodiments of this application may further be applied to a scenario of, for example, communication between UEs or communication between network devices in a 5G communications system.

Figure 1:
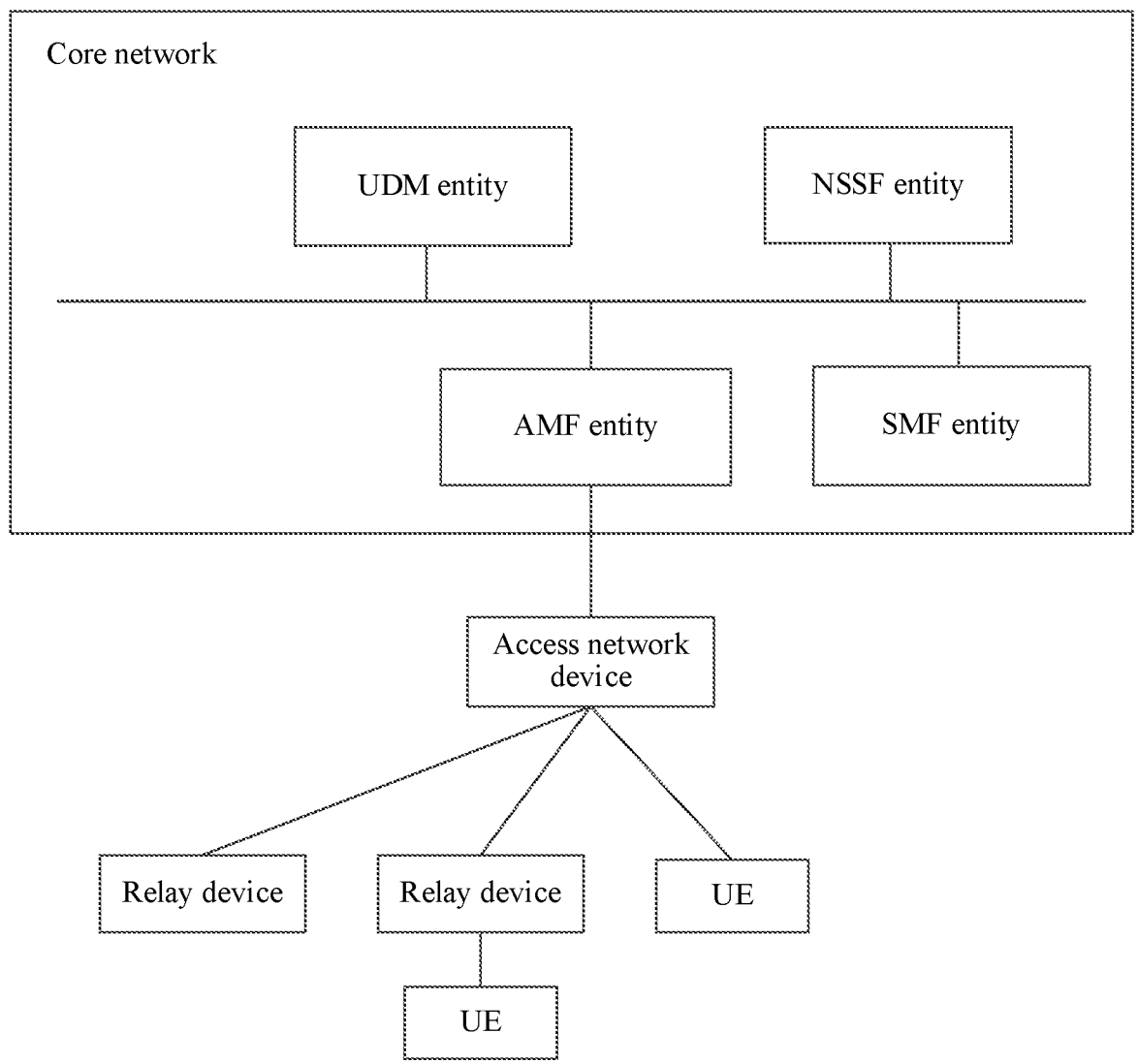
FIG. 1 is a schematic diagram of an architecture of a system to which a technical solution is applicable according to an embodiment of this application.

The technical solutions provided in the embodiments of this application may be applied to an architecture of a system shown in FIG. 1. The communications system may include a core network, an access network device, a relay device, and UE.

Main functions of the core network are to provide a user connection, manage a user, complete service carrying, and act as a bearer network to provide an interface to an external network. The management on a user includes mobility management, call management, route management, security management, and the like. An NR system is used as an example. Devices in a core network may include an access and mobility control function (AMF) entity, a session management function (SMF) entity, a unified subscription database management (UDM) entity, and a network slice selection function (NSSF) entity. The AMF entity is configured to provide mobility management, access authentication, a security anchor function, and a security context management function for the UE. The SMF entity is configured to: manage a session, select and control a user plane, perform downlink data notification, and so on. The UDM entity is configured to manage subscription information and authenticate a user. The NSSF entity is configured to implement functions such as network slice selection and management. Certainly, the core network may further include another device and function entity, or other function entities may be used to replace the foregoing function entities to provide the foregoing functions, and a quantity of each type of function entities may be configured based on a specific requirement. The core network may alternatively be a device or system providing the foregoing functions in a future evolved system or a plurality of communications convergence systems. This is not limited in the embodiments of this application.

The access network device is configured to provide an access service for the UE. The access network device may be a radio access network (RAN) device, for example, a base station. The base station may include base stations in various forms such as a macro base station, a micro base station (also referred to as a small cell), a relay station, an access point, and the like. A base station device corresponds to a service coverage area, and UE entering the area may communicate with the base station device by using a radio signal, to receive a radio access service provided by the base station device. The access network device may alternatively be a wired broadband access network Wireline. The access network device may alternatively be any device that can communicate with UE. For example, the access network device may be a relay station or an access point.

The access network device may be a base transceiver station (BTS) in a global system for mobile communications (GSM) or a code division multiple access (CDMA) network, may be an NB (NodeB) in a wideband code division multiple access (WCDMA), or may be an eNB or an eNodeB (evolutional NodeB) in LTE. Alternatively, the access network device may be a radio controller in a cloud radio access network ( ) scenario. Alternatively, the access network device may be a network device in a 5G NR system network, for example, a transmission point (TRP) or a network device in a future evolved PLMN network; or may be a wearable device, a vehicle-mounted device, or the like.

The relay device is configured to provide a function of accessing the access network device for the UE. The relay device may be a CPE or an AP of a wired broadband access network, and provides an access manner of a Wi-Fi connection or a D2D connection for the UE. Alternatively, the relay device may be a relay node or relay UE in a relay technology, forwards a radio signal of the access network device for one or more times, and provides a relay service for remote UE to connect to an access network.

The UE may access the access network device by using the relay device, or may directly access the access network device. The UE may be an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (Wireless Local Loop, WLL) station, a personal digital assistant (PDA), a handheld device having a wireless communication function, a computing device or another processing device connected to a wireless modem, a vehicle-mounted device, a wearable device, a terminal in a 5G network, or a terminal in a future evolved PLMN network.

It should be noted that the system architecture shown in FIG. 1 is merely used as an example, and is not intended to limit the technical solutions of this application. A person skilled in the art should understand that, in a specific implementation process, the system architecture may further include another device, and a quantity of network devices and a quantity of UEs may be configured based on a specific requirement.

Optionally, the UE, the relay device, or the device in the core network in FIG. 1 may be implemented by one physical device, may be jointly implemented by a plurality of physical devices, or may be a logical functional module in one physical device. This is not limited in the embodiments of this application.

Figure 2:
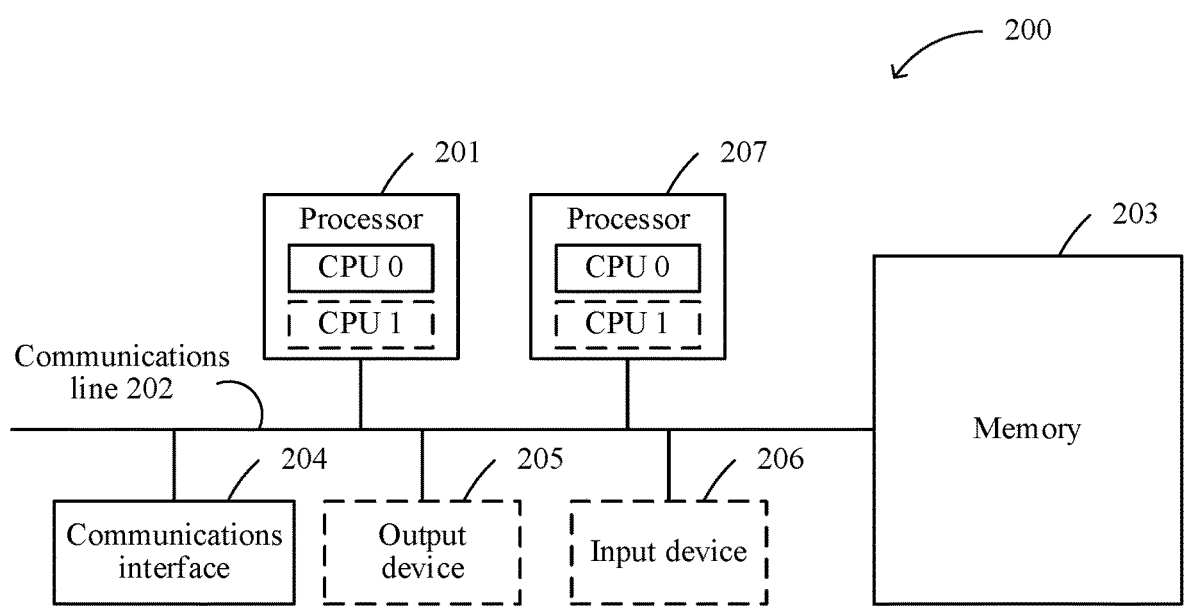
FIG. 2 is a schematic structural diagram of hardware of a communications device according to an embodiment of this application.

For example, the UE, the relay device, or the device in the core network in FIG. 1 may be implemented by using a communications device in FIG. 2. FIG. 2 is a schematic structural diagram of hardware of the communications device according to an embodiment of this application. The communications device 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits that are configured to control execution of a program in a solution of this application.

The communications line 202 may include a path for transmitting information between the foregoing components.

The communications interface 204 is an apparatus that uses any transceiver, and is configured to communicate with another device or another communications network, such as an Ethernet, a radio access network (RAN), or a wireless local area network (WLAN).

The memory 203 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory 203 may exist independently, and is connected to the processor 201 by using the communications line 202. Alternatively, the memory 203 may be integrated with the processor 201.

The memory 203 is configured to store a computer-executable instruction for executing the solutions of this application, and the processor 201 controls the execution. The processor 201 is configured to execute the computer-executable instruction stored in the memory 203, to implement a session establishment method, a relay device selection method, and a registration method that are provided in the following embodiments of this application.

Optionally, the computer-executable instruction in this embodiment of this application may also be referred to as application program code. This is not limited in this embodiment of this application.

During specific implementation, in an embodiment, the processor 201 may include one or more CPUs, for example, a CPU 0 and a CPU 1 in FIG. 2.

During specific implementation, in an embodiment, the communications device 200 may include a plurality of processors, for example, the processor 201 and a processor 207 in FIG. 2. Each of the processors may be a single-core (single-CPU) processor or a multi-core (multi-CPU) processor. The processors herein may be one or more devices, circuits, and/or processing cores for processing data (for example, a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (cathode ray tube, CRT) display device, or a projector. The input device 206 communicates with the processor 201, and may receive input from a user in a plurality of manners. For example, the input device 206 may be a mouse, a keyboard, a touchscreen device, a sensing device, or the like.

The communications device 200 may be a general-purpose device or a dedicated device. During specific implementation, the communications device 200 may be a desktop computer, a portable computer, a network server, a palmtop computer (PDA), a mobile phone, a tablet computer, a wireless terminal device, an embedded device, or a device with a structure similar to that in FIG. 2. A type of the communications device 200 is not limited in this embodiment of this application.

The following explains and describes some terms in this application to help a reader have a better understanding:

1. Network Slice 5G networks will be oriented to different application scenarios, such as an ultra-high-definition (UHD) video, virtual reality, large-scale internet of things, and internet of vehicles. Different application scenarios have different requirements on network mobility, security, latency, reliability, and even charging modes. Therefore, a physical network needs to be divided into a plurality of virtual networks, and each virtual network is oriented to a different application scenario requirement. Virtual networks are logically independent of each other, and do not affect each other. Different sessions of user equipment are established in different network slices, and sessions in different network slices need to use different network resources.

2. S-NSSAI

The S-NSSAI is used to record assistance information of a network slice, and one piece of S-NSSAI identifies one network slice.

3. DRB

The DRB is a data bearer between UE and an access network device. If the UE accesses the access network device by using a relay device, an uplink transmission direction of UE data is: UE->relay device->access network device, and a downlink transmission direction is: access network device->relay device->UE. A DRB that belongs to the relay device and that is between the relay device and the access network device needs to be used for data transmission between the UE and the access network device.

4. The term "a plurality of" in this specification means two or more. In this specification, terms such as "first" and "second" are intended to distinguish between different objects but do not indicate a particular order of the objects. For example, a first registration request message and a second registration request message are merely used to distinguish between different registration request messages, and a sequence of the first registration request message and the second registration request message is not limited. The term "and/or" in this specification describes only an association relationship for describing associated objects and represents that three relationships may exist. For example, A and/or B may represent the following three cases: Only A exists, both A and B exist, and only B exists.

In embodiments of this application, words such as "example" and "for example" are used to represent giving an example, an illustration, or a description. Any embodiment or design scheme described as "for example" or "example" in the embodiments of this application should not be interpreted as being preferable or having more advantages than another embodiment or design scheme. Exactly, use of the words such as "example" or "for example" is intended to present a relative concept in a specific manner.

Figure 3:
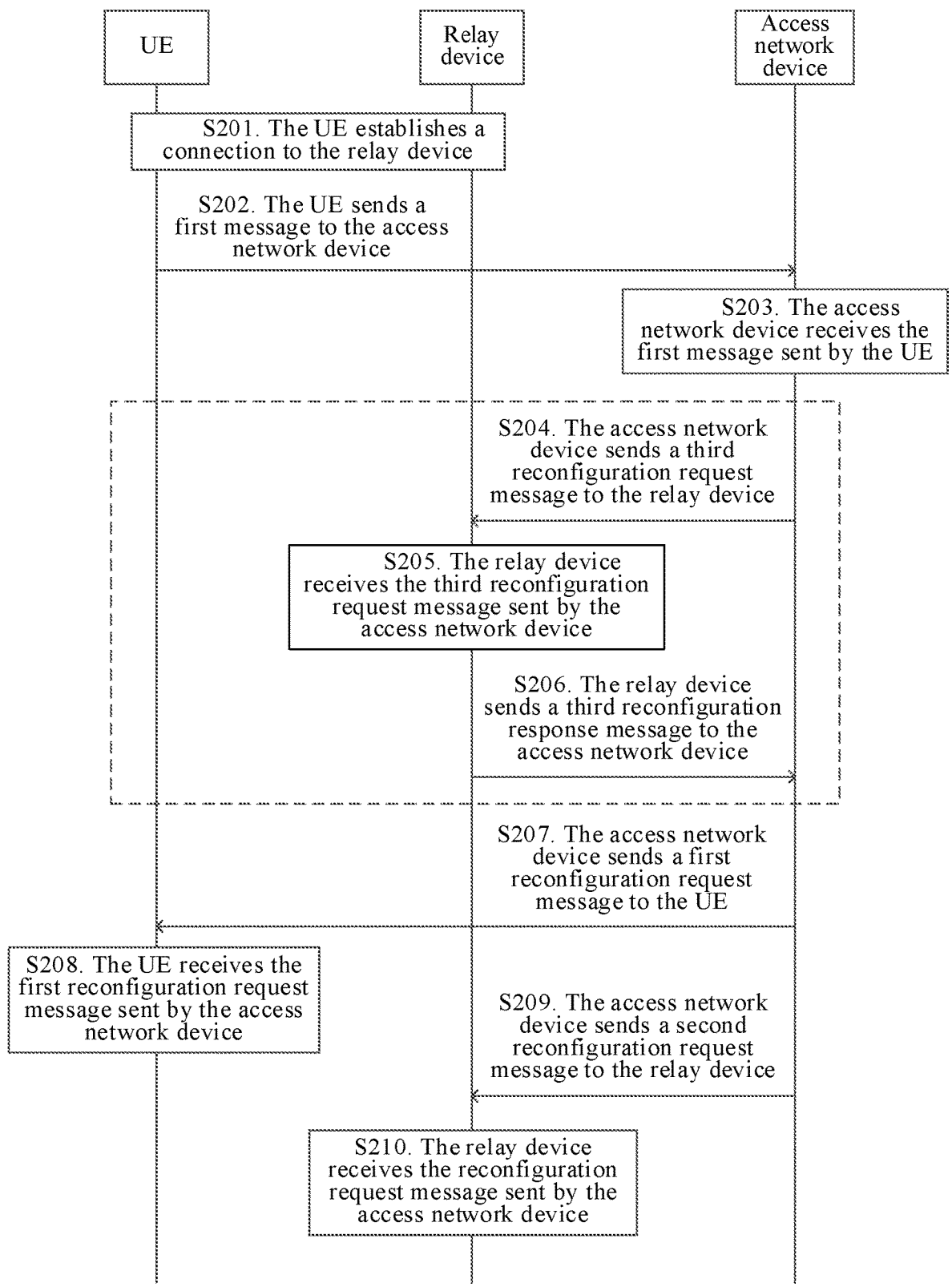
FIG. 3 is a first schematic diagram of a session establishment method according to an embodiment of this application.

An embodiment of this application provides a session establishment method, which may be applied to the communications system shown in FIG. 1. In this way, UE can establish a session in a network slice by using a relay device. The UE and the relay device share a DRB of the relay device. As shown in FIG. 3, the method may include operations S201 to S210.

S201. The UE establishes a connection to the relay device.

Optionally, the UE establishes a wireless fidelity (Wi-Fi) connection or a D2D connection to the relay device.

S202. The UE sends a first message to an access network device.

If the UE needs to establish a session in a slice, the UE initiates a session establishment process.

The UE sends the first message to the access network device, where the first message includes a first session establishment request message and S-NSSAI that is requested by the UE. The first message may be a radio resource control (RRC) message sent by the UE to the access network device, or may be a non-access stratum (NAS) message.

S203. The access network device receives the first message sent by the UE. If the relay device to which the UE establishes a connection does not have a corresponding DRB in the S-NSSAI requested by the UE, operation S204 is performed; or if the relay device to which the UE establishes a connection has a corresponding DRB in the S-NSSAI requested by the UE, operation S207 is performed.

After receiving the first message sent by the UE, the access network device forwards, to an SMF entity by using an AMF entity, the first session establishment request message and the S-NSSAI requested by the UE that are in the first message. The SMF entity establishes a session for the UE in a network slice corresponding to the S-NSSAI, and sends a first session establishment response message and the S-NSSAI to the access network device by using the AMF entity. After receiving the first session establishment response message and the S-NSSAI, the access network device determines whether the relay device to which the UE establishes a connection has a corresponding DRB in the S-NSSAI requested by the UE. If the relay device to which the UE establishes a connection does not have a corresponding DRB in the S-NSSAI requested by the UE, operation S204 is performed; or if the relay device to which the UE establishes a connection has a corresponding DRB in the S-NSSAI requested by the UE, operation S207 is performed.

S204. The access network device sends a third reconfiguration request message to the relay device.

For example, the third reconfiguration request message may be an RRC connection reconfiguration request message. The third reconfiguration request message is used to indicate the relay device to establish the DRB corresponding to the S-NSSAI requested by the UE.

S205. The relay device receives the third reconfiguration request message sent by the access network device.

After receiving the third reconfiguration request message sent by the access network device, the relay device establishes the DRB corresponding to the S-NSSAI requested by the UE.

S206. The relay device sends a third reconfiguration response message to the access network device.

The relay device sends the third reconfiguration response message to the access network device. For example, the third reconfiguration response message may be an RRC connection reconfiguration response message. The third reconfiguration response message includes S-NSSAI and DRB configuration information corresponding to the S-NSSAI. Then, operation S207 is performed.

S207. The access network device sends a first reconfiguration request message to the UE.

For example, the first reconfiguration request message may be an RRC connection reconfiguration request message.

The first reconfiguration request message includes the first session establishment response message and the DRB configuration information. The DRB configuration information corresponds to the S-NSSAI requested by the UE.

S208. The UE receives the first reconfiguration request message sent by the access network device.

Optionally, after receiving the first reconfiguration request message sent by the access network device, the UE obtains the DRB configuration information corresponding to the requested S-NSSAI, and may transmit signaling and/or data on a DRB corresponding to the obtained DRB configuration information.

S209. The access network device sends a second reconfiguration request message to the relay device.

For example, the second reconfiguration request message may be an RRC connection reconfiguration request message.

The second reconfiguration request message includes the DRB configuration information and a UE identity of the UE.

The DRB configuration information corresponds to the S-NSSAI requested by the UE.

S210. The relay device receives the reconfiguration request message sent by the access network device.

It should be noted that the reconfiguration request message received by the relay device is the second reconfiguration request message sent by the access network device to the relay device.

Optionally, after receiving the second reconfiguration request message sent by the access network device, the relay device obtains the DRB configuration information and the UE identity of the UE, and may transmit signaling and/or data of the UE on the DRB corresponding to the DRB configuration information.

It should be noted that, based on an actual situation, the access network device may first send the first reconfiguration request message to the UE, and then send the second reconfiguration request message to the relay device; or may first send the second reconfiguration request message to the relay device, and then send the first reconfiguration request message to the UE; or may send the first reconfiguration request message to the UE and send the second reconfiguration request message to the relay device simultaneously. A sequence of S207 and S209 is not limited in this application.

According to the session establishment method provided in this embodiment of this application, when the UE is connected to the relay device, the UE requests to establish a session in a network slice, and the UE needs to use the DRB between the relay device and the access network device. If the relay device does not have a corresponding DRB in the network slice, the DRB corresponding to the network slice is established. The access network device selects a relay device for the UE, and transmits signaling and/or data for the UE on a DRB in a network slice requested by the UE. In this way, the UE can establish a session in a network slice by using the relay device.

Figure 4:
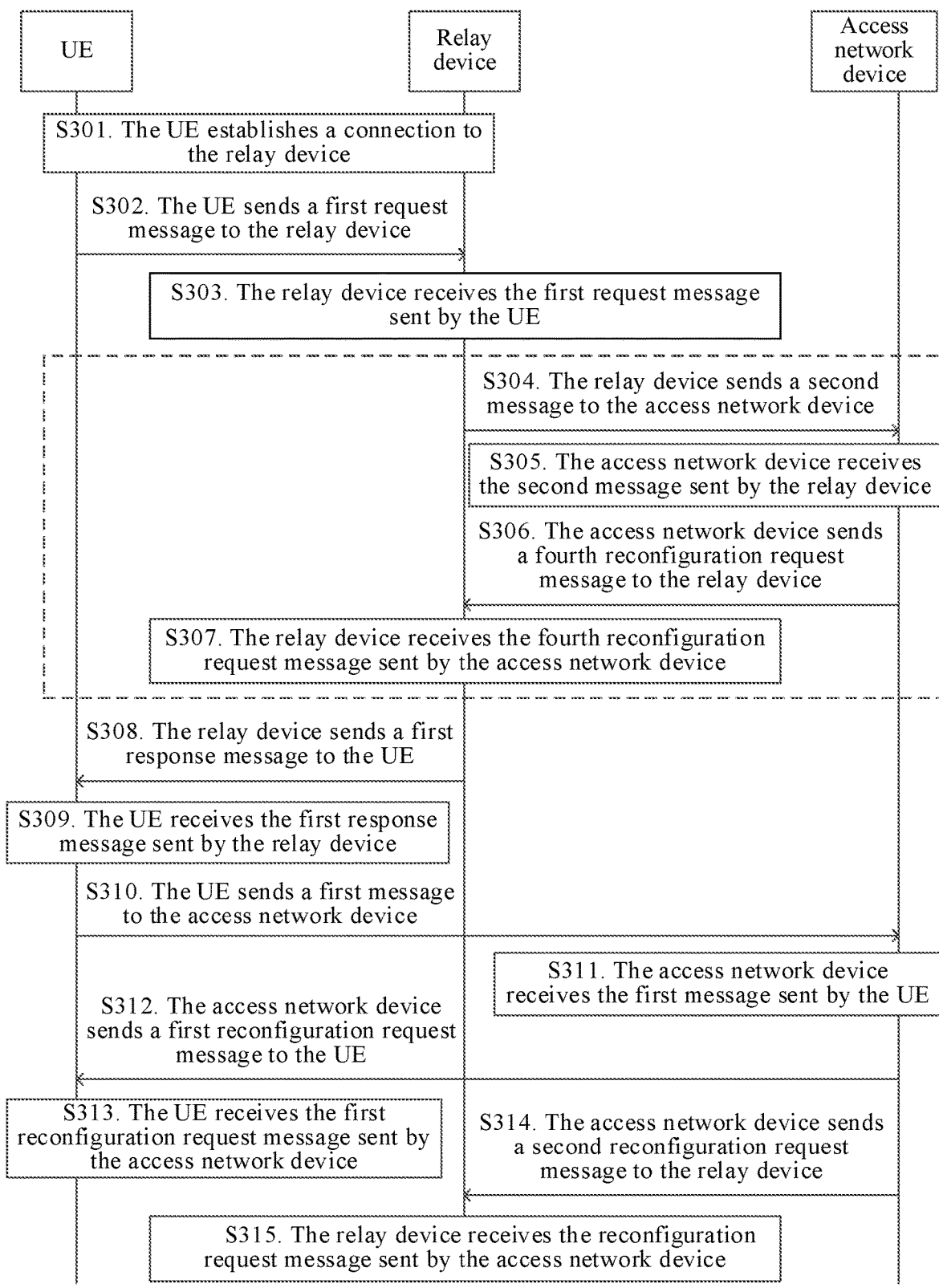
FIG. 4 is a second schematic diagram of a session establishment method according to an embodiment of this application.

An embodiment of this application further provides a session establishment method, which may be applied to the communications system shown in FIG. 1. UE can establish a session in a network slice by using a relay device. The UE shares a DRB corresponding to the session of the relay device in the slice. As shown in FIG. 4, the method may include operations S301 to S315.

S301. The UE establishes a connection to the relay device.

Optionally, the UE establishes a wireless fidelity (Wi-Fi) connection or a D2D connection to the relay device.

S302. The UE sends a first request message to the relay device.

If the UE needs to establish a session in a slice, the UE initiates a session establishment process.

The UE sends the first request message to the relay device, where the first request message includes S-NSSAI requested by the UE, and the first request message is used to notify the relay device that the UE requests to establish a session in a network slice indicated by the S-NSSAI. For example, the first request message may be a new session request message.

S303. The relay device receives the first request message sent by the UE. If no session is established for the relay device in a network slice requested by the UE, operation S304 is performed; or if a session is established for the relay device, operation S308 is performed.

After receiving the first request message sent by the UE, the relay device checks whether a session is established for the relay device in the network slice requested by the UE. If no session is established for the relay device, operation S304 is performed; or if a session is established for the relay device, operation S308 is performed.

S304. The relay device sends a second message to an access network device.

The relay device initiates a process of establishing a session in the network slice requested by the UE. The relay device sends the second message to the access network device, where the second message includes a session establishment request message and the S-NSSAI requested by the UE. For example, the second message may be an RRC message sent by the relay device to the access network device.

S305. The access network device receives the second message sent by the relay device.

After receiving the second message sent by the relay device, the access network device forwards, to an SMF entity by using an AMF entity, the session establishment request message and the S-NSSAI requested by the UE. The SMF entity establishes a session for the relay device in a network slice corresponding to the S-NSSAI, and sends a session establishment response message and the S-NSSAI to the access network device by using the AMF entity. After receiving the session establishment response message, the access network device sends a second session establishment response message to the relay device.

S306. The access network device sends a fourth reconfiguration request message to the relay device.

The access network device sends the fourth reconfiguration request message to the relay device, where the fourth reconfiguration request message includes the second session establishment response message. For example, the fourth reconfiguration request message may be an RRC connection reconfiguration request message sent by the access network device to the relay device.

S307. The relay device receives the fourth reconfiguration request message sent by the access network device.

Optionally, after receiving the fourth reconfiguration request message sent by the access network device, the relay device obtains the second session establishment response message, and determines that the relay device successfully establishes the session in the S-NSSAI requested by the UE.

S308. The relay device sends a first response message to the UE.

After determining that the session is successfully established in the S-NSSAI requested by the UE, the relay device sends the first response message to the UE, where the first response message includes first indication information. The first indication information is used to indicate whether the relay device successfully establishes the session in the S-NSSAI requested by the UE. For example, the first response message may be a new session response message.

S309. The UE receives the first response message sent by the relay device. If it is determined that the relay device successfully establishes the session in the S-NSSAI requested by the UE, operation 310 is performed.

S310. The UE sends a first message to the access network device.

The first message includes a first session establishment request message and the S-NSSAI requested by the UE. The first message may be an RRC message sent by the UE to the access network device.

S311. The access network device receives the first message sent by the UE.

After receiving the first message sent by the UE, the access network device forwards, to the SMF entity by using the AMF entity, the first session establishment request message and the S-NSSAI requested by the UE that are in the first message. The SMF entity establishes a session for the UE in the network slice corresponding to the S-NSSAI, and sends a first session establishment response message and the S-NSSAI to the access network device by using the AMF entity.

S312. The access network device sends a first reconfiguration request message to the UE.

After receiving the first session establishment response message, the access network device sends the first reconfiguration request message to the UE. For example, the first reconfiguration request message may be an RRC connection reconfiguration request message.

The first reconfiguration request message includes the first session establishment response message and DRB configuration information. The DRB configuration information corresponds to the S-NSSAI requested by the UE. For example, the DRB configuration information may be configuration information of a DRB corresponding to the session established by the relay device in the slice in S304 to S307.

S313. The UE receives the first reconfiguration request message sent by the access network device.

Optionally, after receiving the first reconfiguration request message sent by the access network device, the UE obtains the DRB configuration information corresponding to the requested S-NSSAI, and may transmit signaling and/or data on a DRB corresponding to the obtained DRB configuration information.

S314. The access network device sends a second reconfiguration request message to the relay device.

For example, the second reconfiguration request message may be an RRC connection reconfiguration request message.

The second reconfiguration request message includes the DRB configuration information and a UE identity of the UE. The DRB configuration information corresponds to the S-NSSAI requested by the UE.

S315. The relay device receives the reconfiguration request message sent by the access network device.

It should be noted that the reconfiguration request message received by the relay device is the second reconfiguration request message sent by the access network device to the relay device.

Optionally, after receiving the second reconfiguration request message sent by the access network device, the relay device obtains the DRB configuration information and the UE identity of the UE, and may transmit signaling and/or data of the UE on the DRB corresponding to the DRB configuration information.

It should be noted that, based on an actual situation, the access network device may first send the first reconfiguration request message to the UE, and then send the second reconfiguration request message to the relay device; or may first send the second reconfiguration request message to the relay device, and then send the first reconfiguration request message to the UE; or may send the first reconfiguration request message to the UE and send the second reconfiguration request message to the relay device simultaneously. A sequence of S312 and S314 is not limited in this application.

According to the session establishment method provided in this embodiment of this application, when the UE is connected to the relay device, the UE requests to establish a session in a network slice, and the UE needs to use the DRB between the relay device and the access network device. If no session is established for the relay device in the network slice, a session for the relay device is established in the network slice. The access network device selects the relay device for the UE. The relay device transmits signaling and/or data for the UE on the DRB in the network slice requested by the UE, that is, on the DRB corresponding to the session of the relay device in the network slice. In this way, the UE can establish a session in a network slice by using the relay device.

Figure 5:
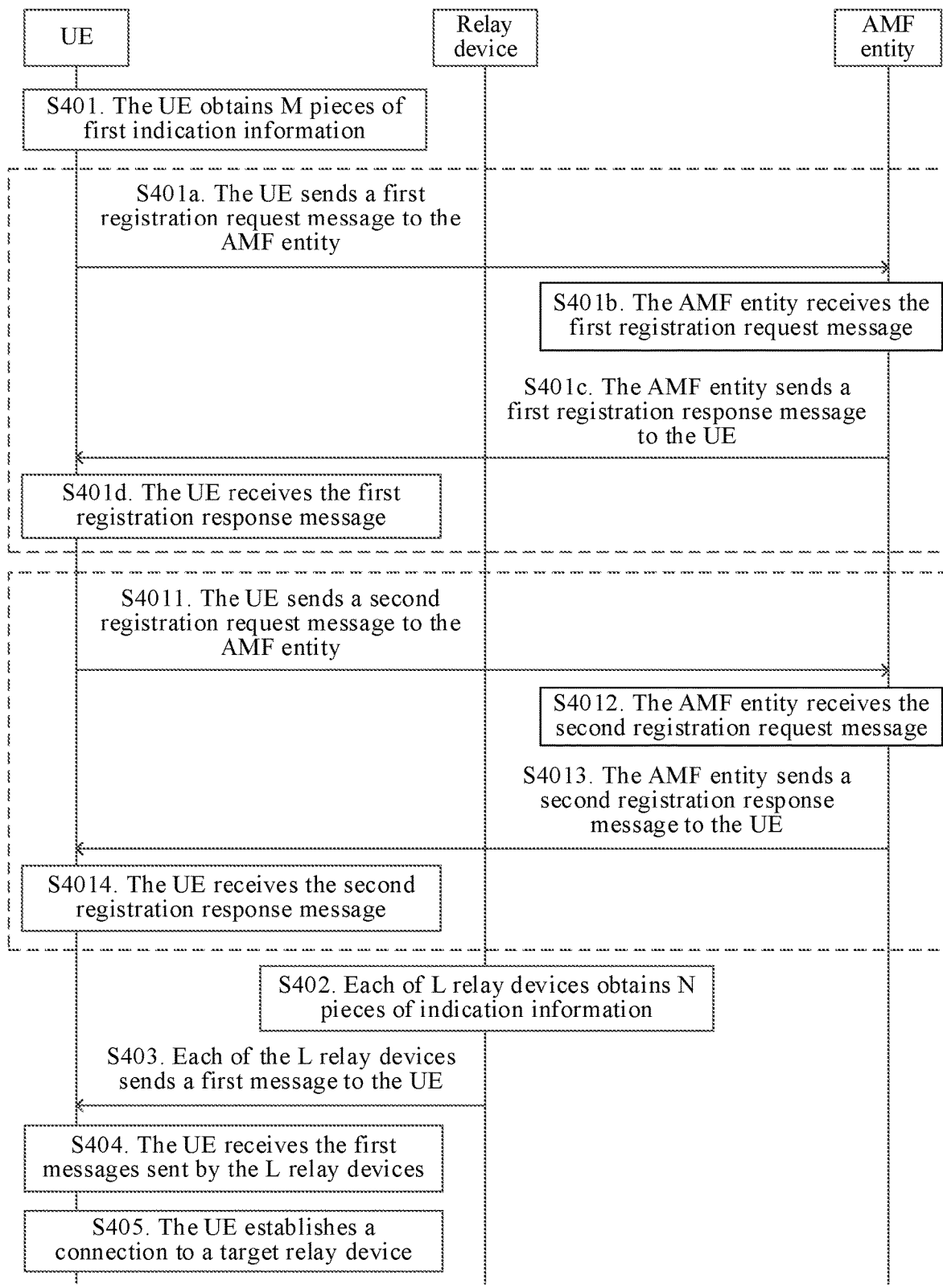
FIG. 5 is a first schematic diagram of a relay device selection method according to an embodiment of this application.

An embodiment of this application further provides a relay device selection method, applied to the communications system shown in FIG. 1. According to the method, a probability that a relay device accessed by UE supports a network slice required the UE can be increased, and a success rate of establishing a session in the network slice by the UE by using the relay device can be increased. As shown in FIG. 5, a relay device selection method provided in an embodiment of this application may include operations S401 to S405.

S401. UE obtains M pieces of first indication information.

The UE obtains an allowed network slice of the UE. Optionally, the UE may obtain the M pieces of first indication information. Each of the M pieces of first indication information is used to indicate one allowed network slice of the UE, and M is a positive integer greater than or equal to 1. Therefore, the UE obtains M allowed network slices.

Optionally, during actual implementation, one piece of first indication information may alternatively be used to indicate a plurality of allowed network slices of the UE. This is not limited in this embodiment of this application.

Optionally, the first indication information is a relay service code (RSC).

Optionally, the UE may obtain the M pieces of first indication information in the following two manners.

Manner 1: The manner may include S401a to S401d.

S401a. The UE sends a first registration request message to an AMF entity.

The first registration request message includes one or more pieces of S-NSSAI requested by the UE.

Optionally, the UE is preconfigured with first information. The first information includes S pieces of S-NSSAI and RSCs in a one-to-one correspondence with the S pieces of S-NSSAI, where S is a positive integer greater than or equal to M.

In an example of this application, the first information may include content shown in Table 1.

TABLE 1

| S-NSSAI configured for the UE | RSC |
| --- | --- |
| S-NSSAI-1 | 1 |
| S-NSSAI-2 | 2 |
| S-NSSAI-3 | 3 |
| S-NSSAI-4 | 4 |
| S-NSSAI-5 | 5 |

In an implementation, the UE selects, as required, one or more pieces of S-NSSAI from the configured S pieces of S-NSSAI as the S-NSSAI requested by the UE. For example, the S-NSSAI requested by the UE includes S-NSSAI-1, S-NSSAI-2, S-NSSAI-3, and S-NSSAI-4.

S401b. The AMF entity receives the first registration request message.

The AMF entity obtains, from the first registration request message, the one or more pieces of S-NSSAI requested by the UE, and requests subscription from a UDM entity. The UDM entity determines, based on the subscription of the UE, that the UE can access a network by using a relay device, and notifies the AMF entity of one or more pieces of S-NSSAI subscribed to by the UE. The AMF entity obtains, from the UDM entity, the one or more pieces of S-NSSAI subscribed to by the UE.

Optionally, the AMF entity sends, to an NSSF entity, the one or more pieces of S-NSSAI requested by the UE and the one or more pieces of S-NSSAI subscribed to by the UE. The NSSF entity determines, based on the one or more pieces of S-NSSAI requested by the UE and the one or more pieces of S-NSSAI subscribed to by the UE, the one or more pieces of allowed S-NSSAI of the UE. For example, the NSSF entity determines, as the one or more pieces of allowed S-NSSAI of the UE, an intersection set of the one or more pieces of S-NSSAI requested by the UE and the one or more pieces of S-NSSAI subscribed to by the UE. For example, the allowed S-NSSAI of the UE includes S-NSSAI-1, S-NSSAI-3, and S-NSSAI-4. The AMF entity obtains, from the NSSF entity, the one or more pieces of allowed S-NSSAI of the UE.

Optionally, the AMF entity may determine, based on the one or more pieces of S-NSSAI requested by the UE and the one or more pieces of S-NSSAI subscribed to by the UE, the one or more pieces of allowed S-NSSAI of the UE.

S401c. The AMF entity sends a first registration response message to the UE.

The AMF entity sends the first registration response message to the UE, where the first registration response message includes the one or more pieces of allowed S-NSSAI of the UE.

S401d. The UE receives the first registration response message.

The UE obtains, from the first registration response message, the one or more pieces of allowed S-NSSAI of the UE.

The UE queries the first information based on the one or more pieces of allowed S-NSSAI of the UE, to obtain the M pieces of first indication information.

For example, the allowed S-NSSAI of the UE includes S-NSSAI-1, S-NSSAI-3, and S-NSSAI-4. The first information includes content shown in Table 1. The UE queries in Table 1 that RSCs corresponding to S-NSSAI-1, S-NSSAI-3, and S-NSSAI-4 are respectively 1, 3, and 4, in other words, three RSCs are obtained.

Manner 2: The manner may include S4011 to S4014.

S4011. UE sends a second registration request message to the AMF entity.

The second registration request message includes the one or more pieces of S-NSSAI requested by the UE.

Optionally, the UE is preconfigured with second information. The second information includes S pieces of S-NSSAI, where S is a positive integer greater than or equal to M.

In an example of this application, the second information may include content shown in Table 2.

TABLE 2

| S-NSSAI configured for the UE |
| --- |
| S-NSSAI-1 |
| S-NSSAI-2 |
| S-NSSAI-3 |
| S-NSSAI-4 |
| S-NSSAI-5 |

In an implementation, the UE selects, as required, the one or more pieces of S-NSSAI from the configured S pieces of S-NSSAI as the S-NSSAI requested by the UE. For example, the S-NSSAI requested by the UE includes S-NSSAI-1, S-NSSAI-2, S-NSSAI-3, and S-NSSAI-4.

S4012. The AMF entity receives the second registration request message.

The AMF entity obtains, from the second registration request message, the one or more pieces of S-NSSAI requested by the UE, and obtains, based on the one or more pieces of S-NSSAI requested by the UE, the one or more pieces of allowed S-NSSAI of the UE and RSCs in a one-to-one correspondence with the one or more pieces of allowed S-NSSAI of the UE.

Optionally, manners in which the AMF entity obtains the allowed S-NSSAI of the UE and the RSCs in a one-to-one correspondence with the one or more pieces of allowed S-NSSAI of the UE may include:

(1) The UDM entity determines the RSCs.

The AMF entity requests subscription from the UDM entity. If the UDM entity determines, based on subscription of the UE, that the UE can access a network by using a relay device, the UDM entity notifies the AMF entity of the one or more pieces of S-NSSAI subscribed to by the UE and RSCs in a one-to-one correspondence with the one or more pieces of S-NSSAI subscribed to by the UE. For example, the one or more pieces of S-NSSAI subscribed to by the UE and the one or more RSCs in a one-to-one correspondence with the one or more pieces of S-NSSAI subscribed to by the UE are shown in Table 3.

The AMF entity sends, to the NSSF entity, the one or more pieces of S-NSSAI requested by the UE and the one or more pieces of S-NSSAI subscribed to by the UE. The NSSF entity determines, based on the one or more pieces of S-NSSAI requested by the UE and the one or more pieces of S-NSSAI subscribed to by the UE, the one or more pieces of allowed S-NSSAI of the UE. For example, the NSSF entity determines, as the one or more pieces of allowed S-NSSAI of the UE, the intersection set of the one or more pieces of S-NSSAI requested by the UE and the one or more pieces of S-NSSAI subscribed to by the UE. For example, the NSSF entity determines that the allowed S-NSSAI of the UE includes S-NSSAI-1, S-NSSAI-3, and S-NSSAI-4.

The NSSF entity sends, to the AMF entity, the one or more pieces of allowed S-NSSAI of the UE.

TABLE 3

| S-NSSAI subscribed to by the UE | RSC |
| --- | --- |
| S-NSSAI-1 | 1 |
| S-NSSAI-3 | 3 |
| S-NSSAI-4 | 4 |
| S-NSSAI-5 | 5 |

The AMF entity obtains the one or more pieces of allowed S-NSSAI of the UE, and obtains, based on the one or more pieces of S-NSSAI subscribed to by the UE and the RSCs in a one-to-one correspondence with the one or more pieces of S-NSSAI subscribed to by the UE, the RSCs in a one-to-one correspondence with the one or more pieces of allowed S-NSSAI of the UE.

For example, the UE queries, in Table 3, RSCs respectively corresponding to S-NSSAI-1, S-NSSAI-3, and S-NSSAI-4, and obtains that the RSCs respectively corresponding to S-NSSAI-1, S-NSSAI-3, and S-NSSAI-4 are 1, 3, and 4.

(2) The NSSF entity determines the RSCs.

The AMF entity requests subscription from the UDM entity. The UDM entity notifies the AMF entity of the one or more pieces of S-NSSAI subscribed to by the UE.

If the AMF entity determines, based on the subscription of the UE, that the UE can access the network by using the relay device, the AMF entity sends, to the NSSF entity, the one or more pieces of S-NSSAI requested by the UE, the one or more pieces of S-NSSAI subscribed to by the UE, and RSC request indication information.

The NSSF entity determines, based on the one or more pieces of S-NSSAI requested by the UE and the one or more pieces of S-NSSAI subscribed to by the UE, the one or more pieces of allowed S-NSSAI of the UE and the RSCs in a one-to-one correspondence with the one or more pieces of allowed S-NSSAI of the UE. For example, the NSSF entity determines, as the one or more pieces of allowed S-NSSAI of the UE, the intersection set of the one or more pieces of S-NSSAI requested by the UE and the one or more pieces of S-NSSAI subscribed to by the UE. For example, the NSSF entity determines that the allowed S-NSSAI of the UE includes S-NSSAI-1, S-NSSAI-3, and S-NSSAI-4, and determines that RSCs corresponding to S-NSSAI-1, S-NSSAI-3, and S-NSSAI-4 are respectively 1, 3, and 4.

The NSSF entity sends, to the AMF entity, the one or more pieces of allowed S-NSSAI of the UE and the RSCs in a one-to-one correspondence with the one or more pieces of allowed S-NSSAI of the UE. The AMF entity obtains the one or more pieces of allowed S-NSSAI of the UE and the RSCs in a one-to-one correspondence with the one or more pieces of allowed S-NSSAI of the UE.

(3) The AMF entity determines the RSCs.

The AMF entity requests subscription from the UDM entity. The UDM entity determines, based on the subscription of the UE, that the UE can access a network by using a relay device, and notifies the AMF entity of one or more pieces of S-NSSAI subscribed to by the UE.

The AMF entity sends, to the NSSF entity, the one or more pieces of S-NSSAI requested by the UE and the one or more pieces of S-NSSAI subscribed to by the UE.

The NSSF entity determines, based on the one or more pieces of S-NSSAI requested by the UE and the one or more pieces of S-NSSAI subscribed to by the UE, the one or more pieces of allowed S-NSSAI of the UE. For example, the NSSF entity determines, as the one or more pieces of allowed S-NSSAI of the UE, the intersection set of the one or more pieces of S-NSSAI requested by the UE and the one or more pieces of S-NSSAI subscribed to by the UE. For example, the NSSF entity determines that the allowed S-NSAI of the UE includes S-NSSAI-1, S-NSSAI-3, and S-NSSAI-4.

The NSSF entity sends, to the AMF entity, the one or more pieces of allowed S-NSSAI of the UE.

If the AMF entity determines, based on the subscription of the UE, that the UE can access the network by using the relay device, the AMF entity determines the RSCs in a one-to-one correspondence with the one or more pieces of allowed S-NSSAI of the UE. For example, the AMF entity determines that RSCs corresponding to S-NSSAI-1, S-NSSAI-3, and S-NSSAI-4 are respectively 1, 3, and 4.

The AMF entity obtains the one or more pieces of allowed S-NSSAI of the UE and the RSCs in a one-to-one correspondence with the one or more pieces of allowed S-NSSAI of the UE.

S4013. The AMF entity sends a second registration response message to the UE.

After obtaining the one or more pieces of allowed S-NSSAI of the UE and the RSCs in a one-to-one correspondence with the one or more pieces of allowed S-NSSAI of the UE, the AMF entity sends the second registration response message to the UE. The second registration response message includes the one or more pieces of allowed S-NSSAI of the UE and the RSCs in a one-to-one correspondence with the one or more pieces of allowed S-NSSAI of the UE.

S4014. The UE receives the second registration response message.

The UE obtains, from the second registration response message, the one or more pieces of allowed S-NSSAI of the UE and the RSCs in a one-to-one correspondence with the one or more pieces of allowed S-NSSAI of the UE, that is, obtains the M pieces of first indication information.

S402. Each of L relay devices obtains N pieces of indication information.

One piece of indication information is used to indicate one allowed network slice of one relay device, L is a positive integer greater than or equal to 1, and N is a positive integer greater than or equal to 1. Optionally, during actual implementation, one piece of indication information may alternatively be used to indicate a plurality of allowed network slices of one relay device. This is not limited in this embodiment of this application.

Optionally, the indication information is an RSC.

For a method for obtaining the N pieces of indication information by each relay device, refer to the method for obtaining the M pieces of first indication information by the UE in S401. Details are not described herein again.

Optionally, during specific implementation, the registration request message sent by the relay device to the AMF entity may not include S-NSSAI requested by the relay device. The NSSF entity may directly determine, as one or more pieces of allowed S-NSSAI of the relay device, one or more pieces of S-NSSAI subscribed to by the relay device.

It should be noted that the AMF entity in S402 may be the same as or different from the AMF entity in S401. This may be determined based on an actual situation. This is not limited in this application.

It should be further noted that in S401, the UE may obtain the M pieces of first indication information in two manners. Correspondingly, each relay device may obtain the N pieces of indication information in two manners. During specific implementation, a manner in which the UE obtains the M pieces of first indication information may be the same as or different from a manner in which each relay device obtains the N pieces of indication information. This is not limited in this application.

S403. Each of the L relay devices sends a first message to the UE.

Each of the L relay devices sends the first message to the UE, and the first message sent by one relay device includes N pieces of second indication information. It should be noted that the N pieces of second indication information are the N pieces of indication information in S402. For example, the first message may be a discovery message.

Optionally, when sending the first message, the relay device broadcasts the first message to all UEs within a discovery range.

S404. The UE receives the first messages sent by the L relay devices.

The UE receives the first messages sent by the L relay devices, and obtains the N pieces of second indication information of each relay device. If network slices indicated by the N pieces of second indication information of a relay device include at least one network slice indicated by the M pieces of first indication information of the UE, that is, the allowed network slices of the relay device include at least one allowed network slice of the UE, the UE determines the relay device as a first relay device. Optionally, in an implementation, if network slices indicated by the N pieces of second indication information of a relay device completely include network slices indicated by the M pieces of first indication information of the UE, the UE determines the relay device as the first relay device. In this way, it can be ensured that the relay device accessed by the UE completely supports the network slice required the UE, and the success rate of establishing a session by the UE by using the relay device can be increased.

Optionally, there may be at least one first relay device determined by the UE.

The UE selects any one of the at least one first relay device as a target relay device.

S405. The UE establishes a connection to the target relay device.

Optionally, the UE establishes a Wi-Fi connection or a D2D connection to the target relay device.

According to the relay device selection method provided in this embodiment of this application, after each UE and each relay device obtains, by using a registration process, allowed network slices of each UE and each relay device, each relay device broadcasts, to UE within a discovery range by using a message, the allowed network slice of the relay device. The UE selects a target relay device, and establishes a connection to the target relay device. One or more allowed network slices of the target relay device include at least one allowed network slice of the UE. Therefore, a probability that the relay device accessed by the UE supports the network slice required the UE can be increased, and a success rate of establishing a session in the network slice by the UE by using the relay device can be increased.

Figure 6:
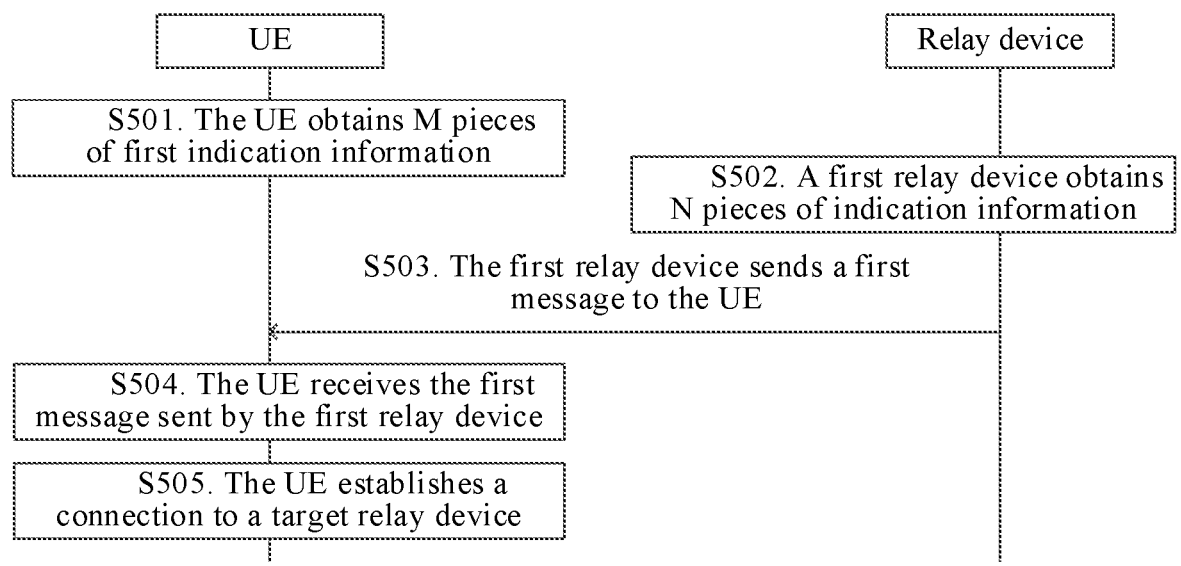
FIG. 6 is a second schematic diagram of a relay device selection method according to an embodiment of this application.

An embodiment of this application further provides a relay device selection method, applied to the communications system shown in FIG. 1. According to the method, a probability that a relay device accessed by UE supports a network slice required the UE can be increased, and a success rate of establishing a session in the network slice by the UE by using the relay device can be increased. As shown in FIG. 6, a relay device selection method provided in an embodiment of this application may include operations S501 to S505.

S501. UE obtains M pieces of first indication information.

Each of the M pieces of first indication information is used to indicate one allowed network slice of the UE, and M is a positive integer greater than or equal to 1. Optionally, during actual implementation, one piece of first indication information may alternatively be used to indicate a plurality of allowed network slices of the UE. This is not limited in this embodiment of this application.

Optionally, the first indication information is an RSC.

For a method for obtaining the M pieces of first indication information by the UE, refer to S401. Details are not described herein again.

S502. A first relay device obtains N pieces of indication information.

One piece of indication information is used to indicate one allowed network slice of the first relay device, and N is a positive integer greater than or equal to 1. Optionally, during actual implementation, one piece of indication information may alternatively be used to indicate a plurality of allowed network slices of the first relay device. This is not limited in this embodiment of this application.

Optionally, the indication information is an RSC.

A method for obtaining the N pieces of indication information by the first relay device is the same as the method for obtaining the N pieces of indication information by each relay device in the foregoing embodiment. For details, refer to S402. Details are not described herein again.

Optionally, the first relay device may be any relay device within a UE discovery range.

It should be further noted that in S501, the UE may obtain the M pieces of first indication information in two manners. Correspondingly, in S502, the first relay device may obtain the N pieces of indication information in two manners. During specific implementation, a manner in which the UE obtains the M pieces of first indication information may be the same as or different from a manner in which the first relay device obtains the N pieces of indication information. This is not limited in this application.

S503. The first relay device sends a first message to the UE.

The first message includes N pieces of second indication information. It should be noted that the N pieces of second indication information are the N pieces of indication information in S502. For example, the first message may be a discovery message.

S504. The UE receives the first message sent by the first relay device.

The UE receives the first message sent by the first relay device, and obtains the N pieces of second indication information of the first relay device. If network slices indicated by the N pieces of second indication information of the first relay device include at least one network slice indicated by the M pieces of first indication information of the UE, that is, one or more allowed network slices of the first relay device include an allowed network slice of the at least one UE, the UE determines the first relay device as a target relay device. Optionally, in an implementation, if the network slices indicated by the N pieces of second indication information of the first relay device completely include the network slices indicated by the M pieces of first indication information of the UE, the UE determines the first relay device as the target relay device. In this way, it can be ensured that the relay device accessed by the UE completely supports the network slice required the UE, and the success rate of establishing a session by the UE by using the relay device can be increased.

S505. The UE establishes a connection to the target relay device.

Optionally, the UE establishes a Wi-Fi connection or a D2D connection to the target relay device.

According to the relay device selection method provided in this embodiment of this application, after the UE and the relay device separately obtain, by using a registration process, allowed network slices of the UE and the relay device, the first relay device notifies, by using a message, the UE of the one or more allowed network slices of the first relay device. If the one or more allowed network slices of the first relay device include at least one allowed network slice of the UE, the UE determines the first relay device as the target relay device, and establishes a connection to the target relay device. According to the relay device selection method, a probability that the relay device accessed by the UE supports the network slice required the UE can be increased, and a success rate of establishing a session in the network slice by the UE by using the relay device can be increased.

Figure 7A:
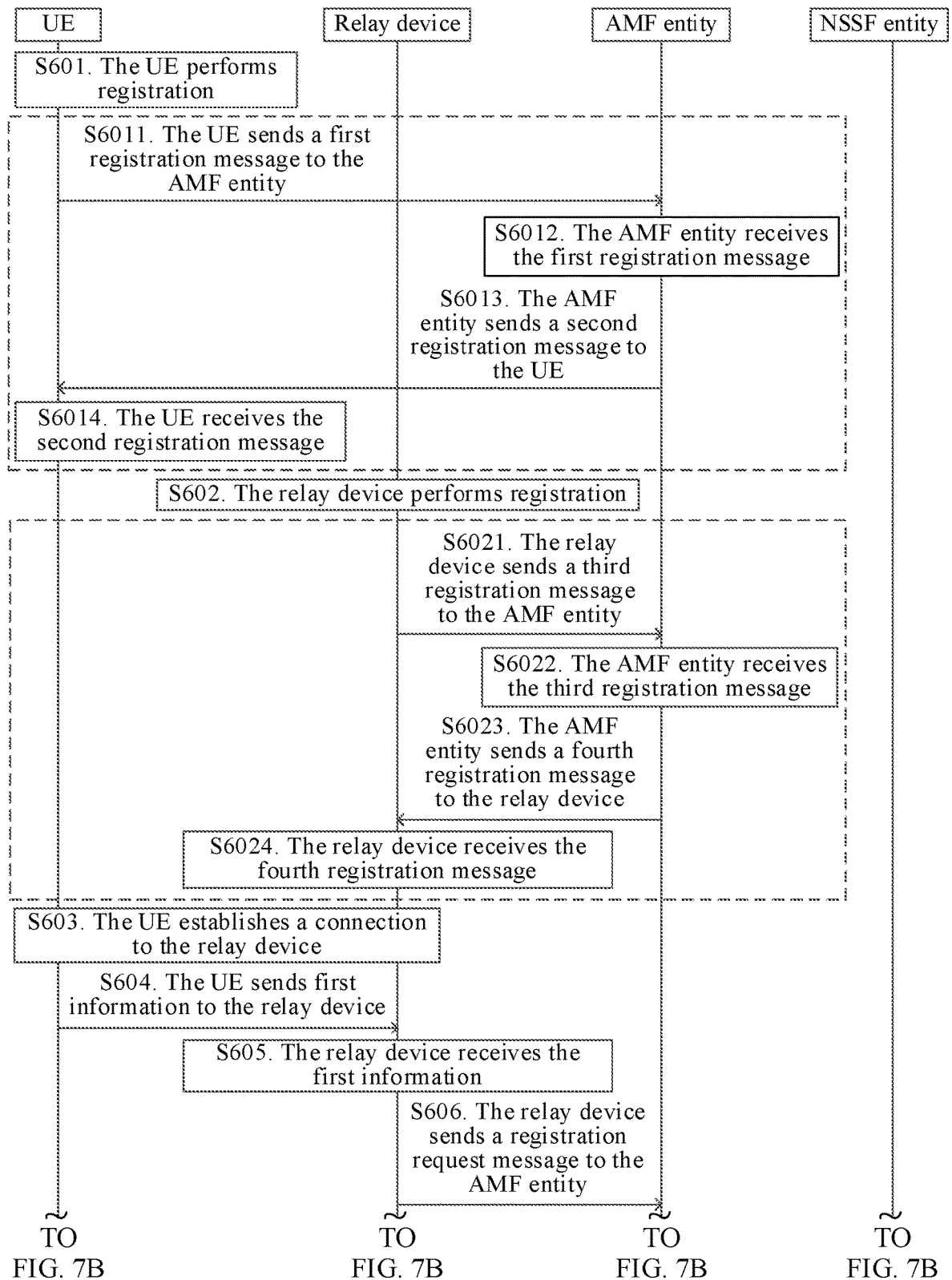
FIG. 7A and FIG. 7B are a schematic diagram of a registration method according to an embodiment of this application.
Figure 7B:
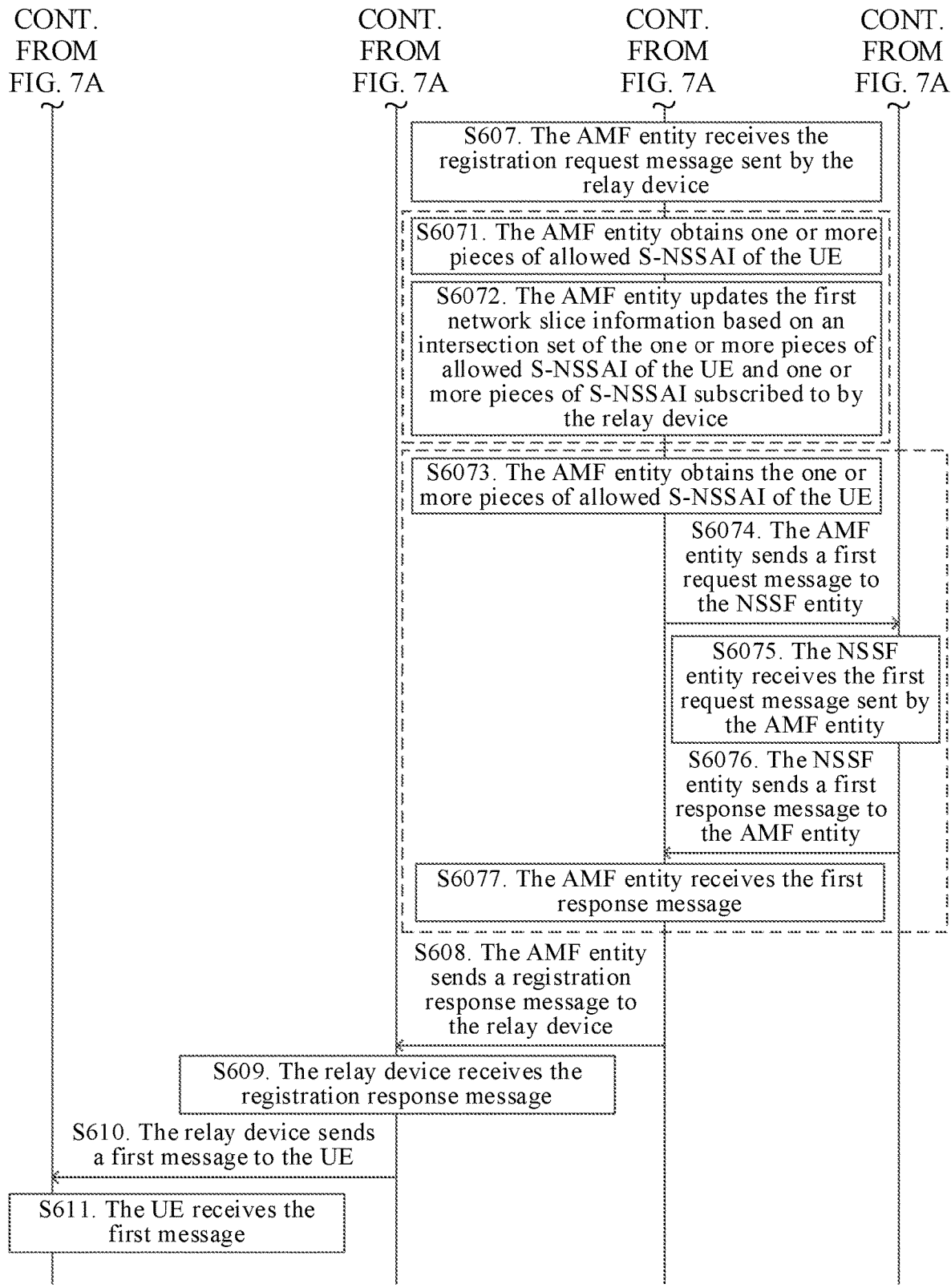

An embodiment of this application further provides a registration method, applied to the communications system shown in FIG. 1. A relay device updates, based on an allowed network slice of UE, an allowed network slice of the relay device. The UE may establish a session in the allowed network slice of the relay device, so that a success rate of establishing a session by the UE in the network slice by using the relay device can be improved. As shown in FIG. 7A and FIG. 7B, the method may include operations S601 to S611.

S601. The UE performs registration.

The UE registers with a network, and may obtain, through registration, an allowed network slice of the UE.

In an implementation, a process in which the UE performs registration may include S6011 to S6014.

S6011. The UE sends a first registration message to an AMF entity.

The first registration message includes one or more pieces of S-NSSAI requested by the UE.

Optionally, the UE is preconfigured with S-NSSAI configuration information. In an example of this application, the S-NSSAI configuration information may include content shown in Table 4.

In an implementation, the UE selects, as required, one or more pieces of S-NSSAI from the S-NSSAI configuration information as the S-NSSAI requested by the UE. For example, the S-NSSAI requested by the UE includes S-NSSAI-1, S-NSSAI-2, S-NSSAI-3, and S-NSSAI-4.

TABLE 4

| S-NSSAI configuration information |
|---|
| S-NSSAI-1 |
| S-NSSAI-2 |
| S-NSSAI-3 |
| S-NSSAI-4 |
| S-NSSAI-5 |

S6012. The AMF entity receives the first registration message.

The AMF entity obtains, from the first registration message, the one or more pieces of S-NSSAI requested by the UE, and requests subscription from a UDM entity. The UDM entity determines, based on the subscription of the UE, that the UE can access a network by using a relay device, and notifies the AMF entity of one or more pieces of S-NSSAI subscribed to by the UE. The AMF entity obtains, from the UDM entity, the one or more pieces of S-NSSAI subscribed to by the UE.

Optionally, the AMF entity sends, to an NSSF entity, the one or more pieces of S-NSSAI requested by the UE and the one or more pieces of S-NSSAI subscribed to by the UE. The NSSF entity determines, based on the one or more pieces of S-NSSAI requested by the UE and the one or more pieces of S-NSSAI subscribed to by the UE, the one or more pieces of allowed S-NSSAI of the UE. For example, the NSSF entity determines, as the one or more pieces of allowed S-NSSAI of the UE, an intersection set of the one or more pieces of S-NSSAI requested by the UE and the one or more pieces of S-NSSAI subscribed to by the UE. For example, the allowed S-NSSAI of the UE includes S-NSSAI-1, S-NSSAI-3, and S-NSSAI-4.

The AMF entity obtains, from the NSSF entity, the one or more pieces of allowed S-NSSAI of the UE.

S6013. The AMF entity sends a second registration message to the UE.

The AMF entity sends the second registration message to the UE, where the second registration message includes the one or more pieces of allowed S-NSSAI of the UE.

S6014. The UE receives the second registration message.

The UE receives the second registration message, and obtains, from the second registration message, the one or more pieces of allowed S-NSSAI of the UE, to complete a registration process.

S602. The relay device performs registration.

The relay device registers with a network, and may obtain, through registration, an allowed network slice of the relay device.

In an implementation, a process in which the relay device performs registration may include S6021 to S6024.

S6021. The relay device sends a third registration message to the AMF entity.

The third registration message is used to request registration.

It should be noted that the AMF entity in S602 may be the same as or different from the AMF entity in S601. This may be determined based on an actual situation. This is not limited in this application.

S6022. The AMF entity receives the third registration message.

The AMF entity requests subscription from the UDM entity. The UDM entity notifies the AMF entity of one or more pieces of S-NSSAI subscribed to by the relay device.

Optionally, the AMF entity sends, to the NSSF entity, the one or more pieces of S-NSSAI subscribed to by the relay device, and the NSSF entity determines, based on the one or more pieces of S-NSSAI subscribed to by the relay device, one or more pieces of allowed S-NSSAI of the relay device. For example, the NSSF entity selects, by default, one or more pieces of S-NSSAI from the one or more pieces of S-NSSAI subscribed to by the relay device, and determines the one or more pieces of selected S-NSSAI as the one or more pieces of allowed S-NSSAI of the relay device.

The AMF entity obtains, from the NSSF entity, the one or more pieces of allowed S-NSSAI of the relay device.

S6023. The AMF entity sends a fourth registration message to the relay device.

The AMF entity sends the fourth registration message to the relay device, where the fourth registration message includes the one or more pieces of allowed S-NSSAI of the relay device.

S6024. The relay device receives the fourth registration message.

The relay device receives the fourth registration message, and obtains, from the fourth registration message, the one or more pieces of allowed S-NSSAI of the relay device, to complete a registration process.

S603. The UE establishes a connection to the relay device.

Optionally, the UE and the relay device discover each other and establish a connection to each other. Optionally, the UE establishes a Wi-Fi connection or a D2D connection to the relay device.

Optionally, the relay device may obtain a UE identity of the UE by using a discovery message, for example, a globally unique temporary UE identity (GUTI). Optionally, the discovery message may alternatively not include a UE identity.

S604. The UE sends first information to the relay device.

Optionally, the UE may send the first information to the relay device by using a second message. Optionally, the first information is the UE identity or second network slice information, and the second network slice information is used to indicate one or more pieces of allowed S-NSSAI of the UE. For example, the second message may be an information update message.

Optionally, if the discovery message includes the UE identity in S603, the UE may not send the first information to the relay device by using the second message, and the relay device may obtain the first information by using the discovery message.

S605. The relay device receives the first information.

The relay device obtains the UE identity or the second network slice information.

In an implementation, the first information is a UE identity, for example, a GUTI. For example, the information update message includes the GUTI.

In an implementation, the first information is second network slice information, for example, the one or more pieces of allowed S-NSSAI of the UE. For example, the information update message includes the one or more pieces of allowed S-NSSAI of the UE and the GUTI.

S606. The relay device sends a registration request message to the AMF entity.

The registration request message sent by the relay device to the AMF entity includes the first information and first indication information. The first indication information is used to indicate the AMF entity to update first network slice information, and the first network slice information is used to indicate the one or more pieces of allowed S-NSSAI of the relay device.

S607. The AMF entity receives the registration request message sent by the relay device.

After receiving the registration request message, the AMF entity updates the first network slice information according to an indication.

Optionally, the AMF entity may update the first network slice information in two manners: The AMF entity updates the first network slice information, or the NSSF entity updates the first network slice information.

In an implementation, the AMF entity updates the first network slice information. The method may include operations S6071 to S6072.

S6071. The AMF entity obtains the one or more pieces of allowed S-NSSAI of the UE.

Optionally, the AMF entity may obtain, in the following two manners, the one or more pieces of allowed S-NSSAI of the UE:

Manner 1: The first information is a UE identity.

The AMF entity sends a second request message to a first AMF entity, where the second request message includes the UE identity and third indication information, and the third indication information is used to indicate the first AMF entity to obtain the one or more pieces of allowed S-NSSAI of the UE. For example, the second request message may be a context transmission request message.

The first AMF entity is an AMF entity that stores context information of the UE. Optionally, the first AMF entity and the foregoing AMF entity may be the same or may be different.

The first AMF entity obtains, based on the UE identity, the one or more pieces of allowed S-NSSAI of the UE. For example, the first AMF entity finds a stored UE context based on the UE identity, and reads, from the UE context, the one or more pieces of allowed S-NSSAI of the UE.

The first AMF entity sends a second response message to the AMF entity, where the second response message includes the UE identity and the one or more pieces of allowed S-NSSAI of the UE. For example, the second response message may be a context transmission response message.

The AMF entity receives the second response message sent by the first AMF entity, and obtains the one or more pieces of allowed S-NSSAI of the UE.

Manner 2: The first information is the second network slice information.

The AMF entity obtains the first information from the registration request message sent by the relay device, where the first information is the second network slice information, and the second network slice information is used to indicate the one or more pieces of allowed S-NSSAI of the UE. The AMF entity obtains, based on the second network slice information, the one or more pieces of allowed S-NSSAI of the UE.

S6072. The AMF entity updates the first network slice information based on an intersection set of the one or more pieces of allowed S-NSSAI of the UE and one or more pieces of S-NSSAI subscribed to by the relay device.

The AMF entity obtains the one or more pieces of S-NSSAI subscribed to by the relay device. For example, the AMF entity requests subscription from the UDM entity. The UDM entity notifies the AMF entity of the one or more pieces of S-NSSAI subscribed to by the relay device.

The AMF entity adds, to the first network slice information, the intersection set of the one or more pieces of allowed S-NSSAI of the UE and the one or more pieces of S-NSSAI subscribed to by the relay device.

For example, the allowed network slices of the relay device are network slices corresponding to S-NSSAI-1, S-NSSAI-2, and S-NSSAI-3. In other words, the first network slice information includes S-NSSAI-1, S-NSSAI-2, and S-NSSAI-3.

The AMF entity obtains that the allowed network slices of the UE are network slices corresponding to S-NSSAI-2, S-NSSAI-3, and S-NSSAI-4; the network slices subscribed to by the relay device are network slices corresponding to S-NSSAI-3, S-NSSAI-4, and S-NSSAI-5; and the intersection set of the allowed network slices of the UE and the network slices subscribed to by the relay device are network slices corresponding to S-NSSAI-3 and S-NSSAI-4.

The AMF entity updates S-NSSAI-3 and S-NSSAI-4 to allowed S-NSSAI-1, S-NSSAI-2, and S-NSSAI-3 of the relay device, to obtain updated first network slice information S-NSSAI-1, S-NSSAI-2, S-NSSAI-3, and S-NSSAI-4. That is, the updated networks slice subscribed to by the relay device are network slices corresponding to S-NSSAI-1, S-NSSAI-2, S-NSSAI-3, and S-NSSAI-4.

In an implementation, the NSSF entity updates the first network slice information. The method may include operations S6073 to S6077.

S6073. The AMF entity obtains the one or more pieces of allowed S-NSSAI of the UE.

For a method for obtaining, by the AMF entity, the one or more pieces of allowed S-NSSAI of the UE, refer to S6071. Details are not described herein again.

S6074. The AMF entity sends a first request message to the NSSF entity.

The AMF entity obtains the one or more pieces of S-NSSAI subscribed to by the relay device. For example, the AMF entity requests subscription from the UDM entity. The UDM entity notifies the AMF entity of the one or more pieces of S-NSSAI subscribed to by the relay device.

The AMF entity sends the first request message to the NSSF entity, where the first request message is used to request the NSSF entity to update the first network slice information, the first network slice information includes the one or more pieces of allowed S-NSSAI of the UE, the one or more pieces of S-NSSAI subscribed to by the relay device, and second indication information, and the second indication information is used to indicate the NSSF entity to update the first network slice information.

S6075. The NSSF entity receives the first request message sent by the AMF entity.

The NSSF entity updates the first network slice information based on the intersection set of the one or more pieces of allowed S-NSSAI of the UE and the one or more pieces of S-NSSAI subscribed to by the relay device.

The NSSF entity adds, to the first network slice information, the intersection set of the one or more pieces of allowed S-NSSAI of the UE and the one or more pieces of S-NSSAI subscribed to by the relay device.

A specific method for updating the first network slice information by the NSSF entity is the same as a specific method for updating the first network slice information by the AMF entity. Details are not described herein again.

S6076. The NSSF entity sends a first response message to the AMF entity.

The first response message includes the updated first network slice information.

S6077. The AMF entity receives the first response message.

The AMF entity receives the first response message, and obtains the updated first network slice information.

S608. The AMF entity sends a registration response message to the relay device.

The registration response message includes the first network slice information.

S609. The relay device receives the registration response message.

S610. The relay device sends a first message to the UE.

The first message includes the first network slice information. For example, the first message may be an information update indication message.

S611. The UE receives the first message.

The UE receives the first message, and may obtain the first network slice information from the first message, that is, obtain the allowed network slice of the relay device. When the UE needs to establish a session, the UE may establish a session in the allowed network slice of the relay device, to improve a session establishment success rate.

According to the registration method provided in this embodiment of this application, the UE and the relay device separately obtain, by using a registration process, allowed network slices of the UE and the relay device, and the UE establishes a connection to a random relay device. The relay device updates, based on the allowed network slice of the UE and the network slice subscribed to by the relay device, the allowed network slice of the relay device, and notifies the UE. The UE may establish a session in the allowed network slice of the relay device, so that a success rate of establishing a session by the UE in the network slice by using the relay device can be improved.

The foregoing mainly describes the solutions provided in the embodiments of this application from a perspective of interaction between the network side device, the relay device, and the user equipment. It may be understood that, to implement the foregoing functions, the network side device, the relay device, and the user equipment include corresponding hardware structures and/or software modules for performing the functions. A person skilled in the art should be easily aware that, in combination with the examples of network units and algorithm operations described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the network side device, the relay device, and the user equipment may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used. An example in which functional modules are divided based on functions is used below for description.

Figure 8:
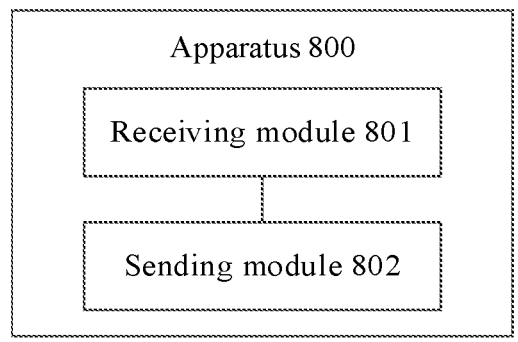
FIG. 8 is a first schematic structural diagram of an apparatus according to an embodiment of this application.

FIG. 8 is a schematic diagram of a logical structure of an apparatus 800 according to an embodiment of this application. The apparatus 800 may be an access network device, and can implement the functions of the access network device in the methods provided in the embodiments of this application. Alternatively, the apparatus 800 may be an apparatus that can support an access network device in implementing the functions of the access network device in the methods provided in the embodiments of this application. The apparatus 800 may be a hardware structure, a software module, or a combination of a hardware structure and a software module. As shown in FIG. 8, the apparatus 800 includes a receiving module 801 and a sending module 802. The receiving module 801 may be configured to perform S203 in FIG. 3, or perform S305, S311, and/or S314 in FIG. 4, and/or perform other operations described in this application. The sending module 802 may be configured to perform S204, S207, and/or S209 in FIG. 3, or perform S306 and/or S312 in FIG. 4, and/or perform other operations described in this application.

Figure 9:
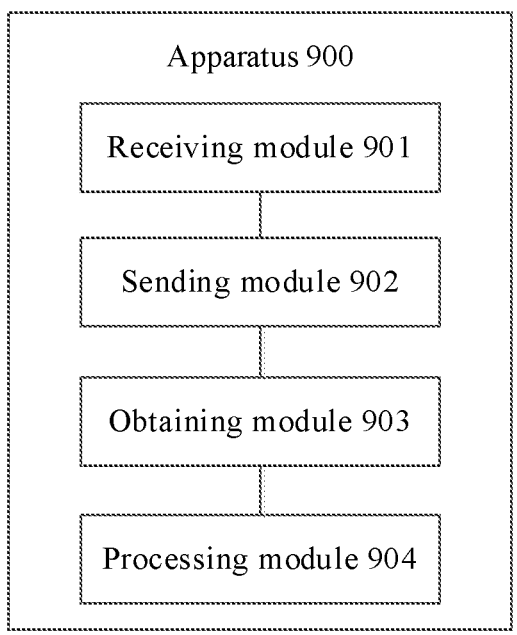
FIG. 9 is a second schematic structural diagram of an apparatus according to an embodiment of this application.

FIG. 9 is a schematic diagram of a logical structure of an apparatus 900 according to an embodiment of this application. The apparatus 900 may be a relay device, and can implement the functions of the relay device in the methods provided in the embodiments of this application. Alternatively, the apparatus 900 may be an apparatus that can support a relay device in implementing the functions of the relay device in the methods provided in the embodiments of this application. The apparatus 900 may be a hardware structure, a software module, or a combination of a hardware structure and a software module. The apparatus 900 may also be implemented by a chip system. In this embodiment of this application, the chip system may include a chip, or may include a chip and another discrete component. As shown in FIG. 9, the apparatus 900 includes a receiving module 901, a sending module 902, an obtaining module 903, and a processing module 904. The receiving module 901 may be configured to perform S205 and/or S210 in FIG. 3, or configured to perform S303, S307, and/or S315 in FIG. 4, or configured to perform S6024, S605, and/or S609 in FIG. 7A and FIG. 7B, and/or perform other operations described in this application. The sending module 802 may be configured to perform S206 in FIG. 3, or configured to perform S304 and/or S308 in FIG. 4, or configured to perform S403 in FIG. 5, or configured to perform S503 in FIG. 6, or configured to perform S6021, S606, and/or S610 in FIG. 7A and FIG. 7B, and/or perform other operations described in this application. The obtaining module 903 may be configured to perform S402 and/or S205 in FIG. 5, or configured to perform S502 in FIG. 6, and/or perform other operations described in this application. The processing module 904 may be configured to perform S201 in FIG. 3, or configured to perform S301 in FIG. 4, or configured to perform S405 in FIG. 5, or configured to perform S505 in FIG. 6, or configured to perform S602 and/or S603 in FIG. 7A and FIG. 7B, and/or perform other operations described in this application.

Figure 10:
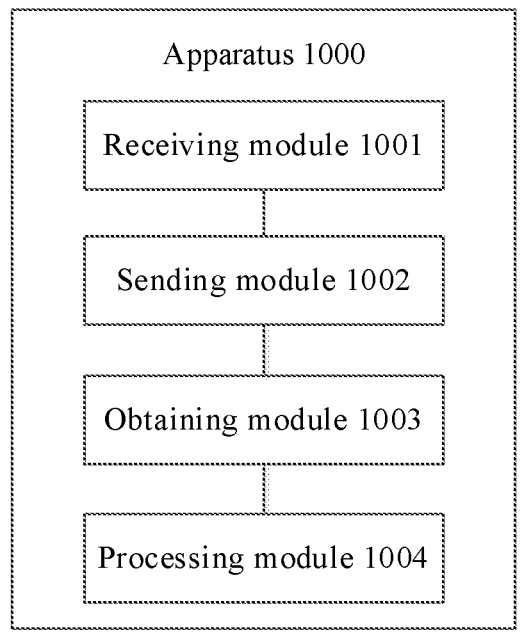
FIG. 10 is a third schematic structural diagram of an apparatus according to an embodiment of this application.

FIG. 10 is a schematic diagram of a logical structure of an apparatus 1000 according to an embodiment of this application. The apparatus 1000 may be user equipment, and can implement the functions of the user equipment in the methods provided in the embodiments of this application. Alternatively, the apparatus 1000 may be an apparatus that can support user equipment in implementing the functions of the user equipment in the methods provided in the embodiments of this application. The apparatus 1000 may be a hardware structure, a software module, or a combination of a hardware structure and a software module. The apparatus 1000 may also be implemented by a chip system. In this embodiment of this application, the chip system may include a chip, or may include a chip and another discrete component. As shown in FIG. 10, the apparatus 1000 includes a receiving module 1001, a sending module 1002, an obtaining module 1003, and a processing module 1004. The receiving module 1001 may be configured to perform S208 in FIG. 3, or configured to perform S309 and/or S313 in FIG. 4, or configured to perform S401d, S4014, and/or S404 in FIG. 5, or configured to perform S504 in FIG. 6, or configured to perform S6014 and/or S611 in FIG. 7A and FIG. 7B, and/or perform other operations described in this application. The sending module 1002 may be configured to perform S202 in FIG. 3, or configured to perform S302 and/or S310 in FIG. 4, or configured to perform S401a and/or S4011 in FIG. 5, or configured to perform S6011 and/or S604 in FIG. 7A and FIG. 7B, and/or perform other operations described in this application. The obtaining module 1003 may be configured to perform S401 in FIG. 5, or configured to perform S501 in FIG. 6, and/or perform other operations described in this application. The processing module 1004 may be configured to perform S201 in FIG. 3, or configured to perform S301 in FIG. 4, or configured to perform S405 in FIG. 5, or configured to perform S505 in FIG. 6, or configured to perform S601 and/or S603 in FIG. 7A and FIG. 7B, and/or perform other operations described in this application.

Figure 11:
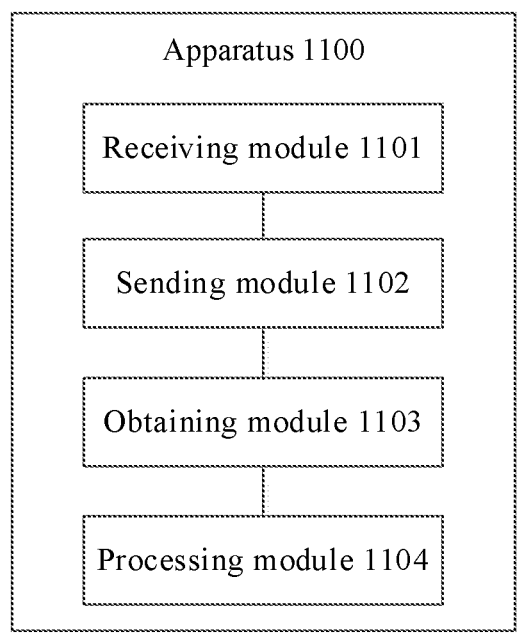
FIG. 11 is a fourth schematic structural diagram of an apparatus according to an embodiment of this application.

FIG. 11 is a schematic diagram of a logical structure of an apparatus 1100 according to an embodiment of this application. The apparatus 1100 may be an AMF entity, and can implement the functions of the AMF entity in the methods provided in the embodiments of this application. Alternatively, the apparatus 1100 may be an apparatus that can support an AMF entity in implementing the functions of the AMF entity in the methods provided in the embodiments of this application. The apparatus 1100 may be a hardware structure, a software module, or a combination of a hardware structure and a software module. The apparatus 1100 may also be implemented by a chip system. In this embodiment of this application, the chip system may include a chip, or may include a chip and another discrete component. As shown in FIG. 11, the apparatus 1100 includes a receiving module 1101, a sending module 1102, an obtaining module 1103, and a processing module 1104. The receiving module 1101 may be configured to perform S401b and/or S4012 in FIG. 5, or configured to perform S6012, S6022, S607, and/or S6077 in FIG. 7A and FIG. 7B, and/or perform other operations described in this application. The sending module 1102 may be configured to perform S401c and/or S4013 in FIG. 5, or configured to perform S6013, S6023, S6074, and/or S608 in FIG. 7A and FIG. 7B, and/or perform other operations described in this application. The obtaining module 1103 may be configured to perform S6071 and/or S6073 in FIG. 7A and FIG. 7B, and/or perform other operations described in this application. The processing module 1104 may be configured to perform S6072 in FIG. 7A and FIG. 7B, and/or perform other operations described in this application.

Figure 12:
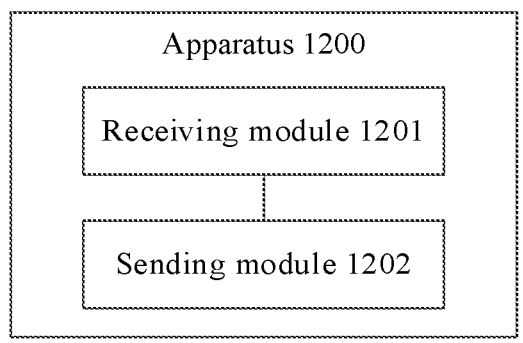
FIG. 12 is a fifth schematic structural diagram of an apparatus according to an embodiment of this application.

FIG. 12 is a schematic diagram of a logical structure of an apparatus 1200 according to an embodiment of this application. The apparatus 1200 may be an NSSF entity, and can implement the functions of the NSSF entity in the methods provided in the embodiments of this application. Alternatively, the apparatus 1200 may be an apparatus that can support an NSSF entity in implementing the functions of the NSSF entity in the methods provided in the embodiments of this application. The apparatus 1200 may be a hardware structure, a software module, or a combination of a hardware structure and a software module. The apparatus 1200 may also be implemented by a chip system. In this embodiment of this application, the chip system may include a chip, or may include a chip and another discrete component. As shown in FIG. 12, the apparatus 1200 includes a receiving module 1201 and a sending module 1202. The receiving module 1201 may be configured to perform S6075 in FIG. 7A and FIG. 7B, and/or perform other operations described in this application. The sending module 1202 may be configured to perform S6076 in FIG. 7A and FIG. 7B, and/or perform other operations described in this application.

All related content of the operations in the foregoing method embodiments may be cited in function descriptions of the corresponding functional modules. Details are not described herein again.

In this embodiment, the apparatus 800, the apparatus 900, the apparatus 1000, the apparatus 1100, or the apparatus 1200 may be presented in a form of functional modules obtained through integration. The "module" herein may be a specific ASIC, a circuit, a processor and a storage device that execute one or more software or firmware programs, an integrated logic circuit, and/or another device that can provide the foregoing functions.

In a simple embodiment, a person skilled in the art may figure out that the apparatus 800, the apparatus 900, the apparatus 1000, the apparatus 1100, or the apparatus 1200 may be in a form shown in FIG. 2.

For example, the processor 201 in FIG. 2 may invoke the computer-executable instruction stored in the memory 203, so that the apparatus 800, the apparatus 900, the apparatus 1000, the apparatus 1100, or the apparatus 1200 performs the session establishment method, the relay device selection method, and the registration method in the foregoing method embodiments.

Function/implementation processes of the receiving module 801 and the sending module 802 in FIG. 8, the receiving module 901, the sending module 902, the obtaining module 903, and the processing module 904 in FIG. 9, the receiving module 1001, the sending module 1002, the obtaining module 1003, and the processing module 1004 in FIG. 10, the receiving module 1101, the sending module 1102, the obtaining module 1103, and the processing module 1104 in FIG. 11, or the receiving module 1201 and the sending module 1202 in FIG. 12 may be implemented by using the processor 201 in FIG. 2 by invoking the computer-executable instruction stored in the memory 203. Alternatively, functions/implementation processes of the obtaining module 903 and the processing module 904 in FIG. 9, the obtaining module 1003 and the processing module 1004 in FIG. 10, or the obtaining module 1103 and the processing module 1104 in FIG. 11 may be implemented by using the processor 201 in FIG. 2 by invoking the computer-executable instruction stored in the memory 203; and functions/implementation processes of the receiving module 801 and the sending module 802 in FIG. 8, the receiving module 901 and the sending module 902 in FIG. 9, the receiving module 1001 and the sending module 1002 in FIG. 10, the receiving module 1101 and the sending module 1102 in FIG. 11, or the receiving module 1201 and the sending module 1202 in FIG. 12 may be implemented by using the communications interface 204 in FIG. 2.

Optionally, when the apparatus 800, the apparatus 900, the apparatus 1000, the apparatus 1100, or the apparatus 1200 is a chip, functions/implementation processes of the receiving module 801 and the sending module 802 in FIG. 8, the receiving module 901 and the sending module 902 in FIG. 9, the receiving module 1001 and the sending module 1002 in FIG. 10, the receiving module 1101 and the sending module 1102 in FIG. 11, or the receiving module 1201 and the sending module 1202 in FIG. 12 may alternatively be implemented by using a pin, a circuit, or the like. Optionally, when the apparatus 800, the apparatus 900, the apparatus 1000, the apparatus 1100, or the apparatus 1200 is a chip, the memory 203 may be a storage unit in the chip, for example, a register or a cache. Certainly, when the apparatus 800, the apparatus 900, the apparatus 1000, the apparatus 1100, or the apparatus 1200 is a terminal, the memory 203 may be a storage unit inside a chip in the terminal. This is not limited in the embodiments of this application.

The apparatuses provided in the embodiments of this application may be configured to perform the session establishment method, the relay device selection method, and the registration method. Therefore, for technical effects that can be achieved by the apparatuses, refer to the foregoing method embodiments. Details are not described herein again.

A person of ordinary skill in the art may understand that all or some of the operations of the foregoing methods may be implemented by a program instructing relevant hardware. The program may be stored in a computer-readable storage medium. The storage medium includes: a ROM, a RAM, and an optical disc.

An embodiment of this application further provides a storage medium. The storage medium may include a memory 203.

For explanations and beneficial effects of related content in any apparatus provided above, refer to the corresponding method embodiments provided in the foregoing description. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital video disc (DVD), a semiconductor medium (for example, a solid-state drive (SSD)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" does not exclude another component or another operation, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A relay device selection method, comprising:
obtaining, by user equipment (UE), M pieces of first indication information, wherein each of the M pieces of first indication information is used to indicate one allowed network slice of the UE, and M is a positive integer greater than or equal to 1;
receiving, by the UE, first messages sent by L relay devices, wherein each of one or more of the first messages sent by a relay device of the L relay devices comprises N pieces of second indication information, and each of the N pieces of second indication information is used to indicate one allowed network slice of the relay device, and L and N are positive integers greater than or equal to 1; and
randomly selecting, by the UE, a first relay device from the L relay devices as a target relay device based on the M pieces of first indication information and the L pieces of first messages, wherein network slices indicated by the N pieces of second indication information of the first relay device comprise at least one network slice indicated by the M pieces of first indication information.

2. The relay device selection method according to claim 1, wherein each of the first indication information and the second indication information each is a relay service code (RSC).

3. The relay device selection method according to claim 2, wherein the UE is preconfigured with first information, the first information comprises S pieces of single-network slice selection assistance information S-NSSAI and RSCs in a one-to-one correspondence with the S pieces of S-NSSAI, and S is a positive integer greater than or equal to M; and the obtaining, by UE, of the M pieces of first indication information comprises:
sending, by the UE, a first registration request message to an access and mobility control function (AMF) entity, wherein the first registration request message comprises one or more pieces of S-NSSAI requested by the UE;
receiving, by the UE, a first registration response message sent by the AMF entity, wherein the first registration response message comprises one or more pieces of allowed S-NSSAI of the UE; and
querying, by the UE, the first information based on the one or more pieces of allowed S-NSSAI of the UE, to obtain the M pieces of first indication information.

4. The relay device selection method according to claim 2, wherein the obtaining, by UE, of the M pieces of first indication information comprises:
sending, by the UE, a second registration request message to an access and mobility control function (AMF) entity, wherein the second registration request message comprises one or more pieces of S-NSSAI requested by the UE;
receiving, by the UE, a second registration response message sent by the AMF entity, wherein the second registration response message comprises one or more pieces of allowed S-NSSAI of the UE and RSCs in a one-to-one correspondence with the one or more pieces of allowed S-NSSAI of the UE; and
obtaining, by the UE, the M pieces of first indication information based on the one or more pieces of allowed S-NSSAI of the UE and the RSCs in a one-to-one correspondence with the one or more pieces of allowed S-NSSAI of the UE.

5. The relay device selection method according to claim 1, wherein after the random selecting, by the UE, of the first relay device as the target relay device based on the M pieces of first indication information and the L pieces of first messages, the method further comprises:
establishing, by the UE, a connection to the target relay device.

6. A relay device selection method, comprising:
obtaining, by user equipment (UE), M pieces of first indication information, wherein each of the M pieces of first indication information is used to indicate one allowed network slice of the UE, and M is a positive integer greater than or equal to 1;
receiving, by the UE, a first message sent by a first relay device, wherein the first message comprises N pieces of second indication information, each of the N pieces of second indication information is used to indicate one allowed network slice of the first relay device, and N is a positive integer greater than or equal to 1; and
when network slices indicated by the N pieces of second indication information comprise at least one network slice indicated by the M pieces of first indication information, determining, by the UE, the first relay device as a target relay device.

7. The relay device selection method according to claim 6, wherein each of the M pieces of first indication information and each of the N pieces of second indication information is a relay service code (RSC).

8. The relay device selection method according to claim 7, wherein the UE is preconfigured with first information, the first information comprises S pieces of single-network slice selection assistance information S-NSSAI and RSCs in a one-to-one correspondence with the S pieces of S-NSSAI, and S is a positive integer greater than or equal to M.

9. The relay device selection method according to claim 8, wherein before the obtaining, by UE, of the M pieces of first indication information, the method further comprises:
sending, by the UE, a first registration request message to an access and mobility control function (AMF) entity, wherein the first registration request message comprises one or more pieces of S-NSSAI requested by the UE; and
receiving, by the UE, a first registration response message sent by the AMF entity, wherein the first registration response message comprises one or more pieces of allowed S-NSSAI of the UE.

10. The relay device selection method according to claim 9, wherein the obtaining, by UE, of the M pieces of first indication information comprises:
obtaining, by the UE, the M pieces of first indication information based on the one or more pieces of allowed S-NSSAI of the UE and the first information.

11. The relay device selection method according to claim 7, wherein before the obtaining, by UE, of the M pieces of first indication information, the method further comprises:
sending, by the UE, a second registration request message to an access and mobility control function (AMF) entity, wherein the second registration request message comprises one or more pieces of S-NSSAI requested by the UE; and
receiving, by the UE, a second registration response message sent by the AMF entity, wherein the second registration response message comprises one or more pieces of allowed S-NSSAI of the UE and RSCs in a one-to-one correspondence with the one or more pieces of allowed S-NSSAI of the UE.

12. The relay device selection method according to claim 11, wherein the obtaining, by UE, of the M pieces of first indication information comprises:
obtaining, by the UE, the M pieces of first indication information based on the one or more pieces of allowed S-NSSAI of the UE and the RSCs in a one-to-one correspondence with the one or more pieces of allowed S-NSSAI of the UE.

13. The relay device selection method according to claim 6, wherein after the determining, by the UE, of the first relay device as a target relay device, the method further comprises:
establishing, by the UE, a connection to the target relay device.

14. User equipment, comprising a processor and a memory, wherein the memory is to store a-computer-executable instructions, and when the user equipment operates, the processor executes the computer-executable instructions stored in the memory, to perform a relay device selection method, the method comprising:
obtaining M pieces of first indication information, wherein each of the M pieces of first indication information is used to indicate one allowed network slice of the UE, and M is a positive integer greater than or equal to 1;
receiving first messages sent by L relay devices, wherein each of one or more of the first message sent by a relay device of the L relay devices comprises N pieces of second indication information, and each of the N pieces of second indication information is used to indicate one allowed network slice of the relay device, and L and N are positive integers greater than or equal to 1; and randomly selecting a random first relay device from the L relay devices as a target relay device based on the M pieces of first indication information and the L pieces of first messages, wherein network slices indicated by the N pieces of second indication information of the first relay device comprise at least one network slice indicated by the M pieces of first indication information.

* * * * *

UNITED STATES PATENT AND TRADEMARK OFFICE
CERTIFICATE OF CORRECTION

| | |
|---|---|
| PATENT NO. | : 11,350,356 B2 |
| APPLICATION NO. | : 17/050281 |
| DATED | : May 31, 2022 |
| INVENTOR(S) | : Haorui Yang et al. |

It is certified that error appears in the above-identified patent and that said Letters Patent is hereby corrected as shown below:

In the Claims

Claim 14, Column 46, Line 53, delete "a-computer" and insert --computer--.

Claim 14, Column 46, Line 64, delete "message" and insert --messages--.

Claim 14, Column 47, Line 3, delete "randomly selecting a random first relay" and insert --randomly selecting a first delay--.

Signed and Sealed this
Second Day of August, 2022

Katherine Kelly Vidal
*Director of the United States Patent and Trademark Office*